(12) United States Patent
Jönsson

(10) Patent No.: US 12,535,818 B2
(45) Date of Patent: Jan. 27, 2026

(54) CONCRETE SURFACE MAPPING ROBOTS, SYSTEMS, AND METHODS FOR PROCESSING CONCRETE SURFACES

(71) Applicant: HUSQVARNA AB, Huskvarna (SE)

(72) Inventor: Andreas Jönsson, Hallsberg (SE)

(73) Assignee: HUSQVARNA AB, Huskvarna (SE)

( * ) Notice: Subject to any disclaimer, the term of this patent is extended or adjusted under 35 U.S.C. 154(b) by 238 days.

(21) Appl. No.: 18/268,101

(22) PCT Filed: Dec. 17, 2021

(86) PCT No.: PCT/SE2021/051277
§ 371 (c)(1),
(2) Date: Jun. 16, 2023

(87) PCT Pub. No.: WO2022/132021
PCT Pub. Date: Jun. 23, 2022

(65) Prior Publication Data
US 2024/0061439 A1    Feb. 22, 2024

(30) Foreign Application Priority Data

Dec. 18, 2020 (SE) .................................... 2051496-4
Mar. 1, 2021 (SE) .................................... 2150222-4

(51) Int. Cl.
*G05D 1/02* (2020.01)
*B24B 7/18* (2006.01)
(Continued)

(52) U.S. Cl.
CPC .............. *G05D 1/024* (2013.01); *B24B 7/18* (2013.01); *B24B 49/12* (2013.01); *B24B 55/06* (2013.01); *E04F 21/245* (2013.01); *G01S 17/89* (2013.01)

(58) Field of Classification Search
CPC .......... G05D 1/024; B24B 7/18; B24B 49/12; B24B 55/06; B24B 49/003; B24B 49/14; B24B 51/00; E04F 21/245; G01S 17/89
See application file for complete search history.

(56) References Cited

U.S. PATENT DOCUMENTS

2004/0022581 A1    2/2004 Corbitt
2005/0220541 A1   10/2005 Corbitt
(Continued)

FOREIGN PATENT DOCUMENTS

AU    2008216946 A1 *  8/2009 ............. B24B 49/12
CN         107414624 A     12/2017
(Continued)

OTHER PUBLICATIONS

Machine Translation: DE-102007000280-A1 (Year: 2008).*
(Continued)

*Primary Examiner* — Anne Marie Antonucci
*Assistant Examiner* — Connor L Knight
(74) *Attorney, Agent, or Firm* — Burr & Forman

(57) ABSTRACT

A concrete surface processing machine (100) for processing a concrete surface, wherein the concrete surface processing machine is arranged to be supported on the concrete surface by one or more support elements (150) extending in a base plane (101) of the machine parallel to the concrete surface, wherein the concrete surface processing machine is arranged to rotate (R) about an axis (C) normal to the base plane (101) by the one or more support elements (150), wherein the concrete surface processing machine comprises control unit (110) connected to at least one laser range finder (120) arranged pointing in a fixed direction from the concrete surface processing machine, and wherein the control unit
(Continued)

(110) is arranged to determine a boundary geometry of the concrete surface based on a sequence of ranges obtained by the laser range finder (120).

17 Claims, 10 Drawing Sheets

(51) Int. Cl.
  *B24B 49/12* (2006.01)
  *B24B 55/06* (2006.01)
  *E04F 21/24* (2006.01)
  *G01S 17/89* (2020.01)
  *G05D 1/00* (2006.01)

(56) References Cited

U.S. PATENT DOCUMENTS

| | | | |
|---|---|---|---|
| 2012/0060320 A1* | 3/2012 | Lee | A47L 9/20 15/347 |
| 2014/0324270 A1 | 10/2014 | Chan et al. | |
| 2016/0292933 A1* | 10/2016 | Sprock | G06Q 50/08 |
| 2017/0297202 A1* | 10/2017 | Lawrence | G05D 1/0219 |
| 2018/0004217 A1* | 1/2018 | Biber | G05D 1/0274 |
| 2018/0202132 A1* | 7/2018 | Hokkanen | G01S 7/2955 |
| 2018/0327982 A1* | 11/2018 | Leukuma | E04F 21/244 |
| 2019/0114798 A1 | 4/2019 | Afrouzi et al. | |
| 2019/0391244 A1* | 12/2019 | Sekiguchi | G01S 17/48 |
| 2022/0299650 A1* | 9/2022 | Forsberg | A47L 11/4011 |
| 2023/0400579 A1* | 12/2023 | Korl | G01S 7/4802 |

FOREIGN PATENT DOCUMENTS

| | | | | |
|---|---|---|---|---|
| CN | 110109466 A | | 8/2019 | |
| DE | 102007000280 A1 | * | 11/2008 | ............ B24B 49/12 |
| JP | 2020060021 A | | 4/2020 | |
| WO | 2015090402 A1 | | 6/2015 | |
| WO | 2018000922 A1 | | 1/2018 | |
| WO | WO-2020102458 A1 | * | 5/2020 | |
| WO | 2021206603 A1 | | 10/2021 | |

OTHER PUBLICATIONS

Machine Translation: AU-2008216946-A1 (Year: 2009).*
International Search Report and Written Opinion for International Application No. PCT/SE2021/051277 mailed Feb. 17, 2022.
Swedish Office Action and Search Report for Swedish Application No. 2150222-4, Mailed on Oct. 25, 2021.

* cited by examiner

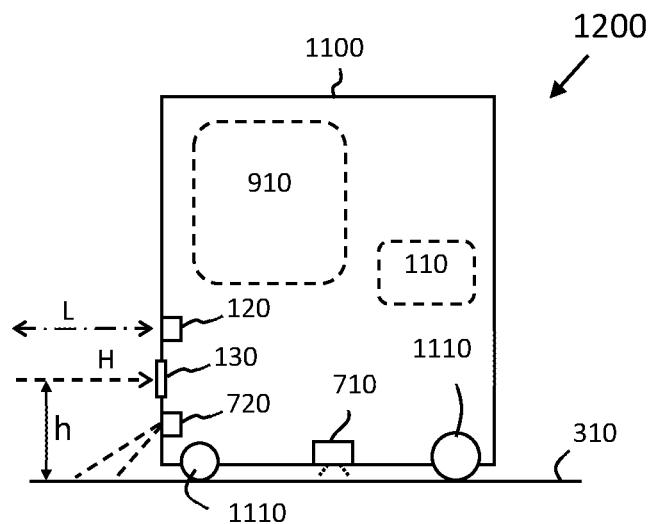
FIG. 12
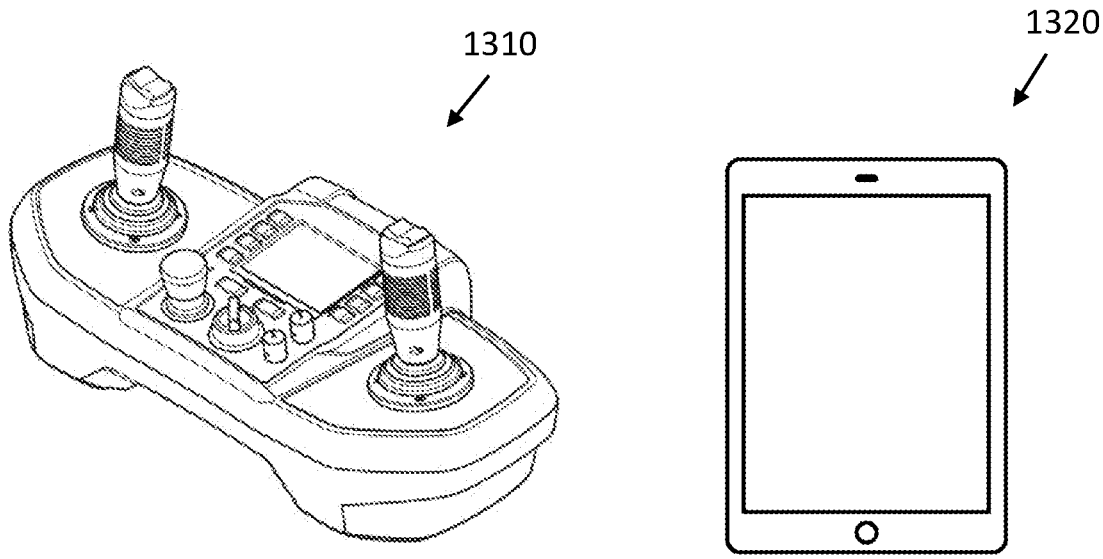
FIG. 13A
FIG. 13B
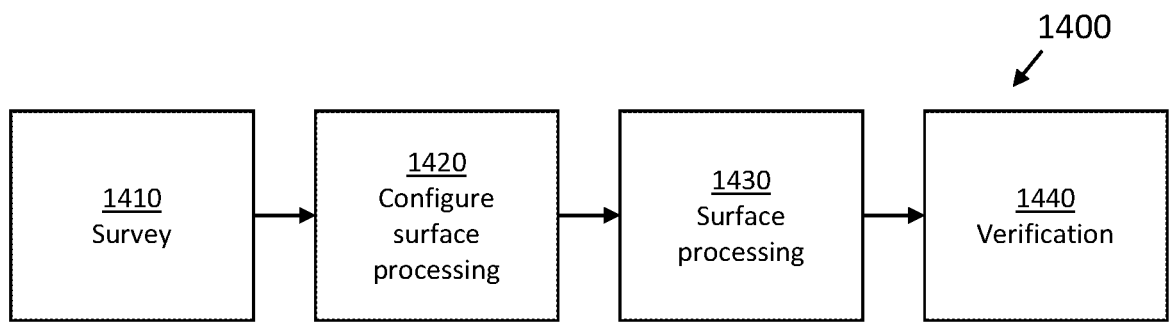
FIG. 14

CONCRETE SURFACE MAPPING ROBOTS, SYSTEMS, AND METHODS FOR PROCESSING CONCRETE SURFACES

TECHNICAL FIELD

The present disclosure relates to machines for processing concrete and stone surfaces, such as troweling machines, floor grinders and vacuum cleaners, and also to surface inspection robots. The disclosed machines comprise means for self-locomotion and are suitable for autonomous or remote controlled operation. At least some of the machines disclosed herein are also arranged for autonomous mapping of a concrete surface.

BACKGROUND

Concrete surfaces are commonly used for flooring in both domestic and industrial facilities. The sizes of concrete surface floors range from a few square meters for a domestic garage floor to thousands of square meters in larger industrial facilities. Concrete surfaces offer a cost efficient and durable flooring alternative and have therefore gained popularity over recent years.

Concrete surface preparation is performed in steps. After the concrete is poured, the surface is first troweled and then grinded flat after the surface has reached a sufficient level of maturity. A matured concrete surface can then be polished to a glossy finish if desired. A floor grinder and/or a power trowel machine can be used to process the concrete surface efficiently.

Increased efficiency can be obtained if the different processing steps are automated by the use of autonomous or semi-autonomous concrete surface processing machines. This type of processing normally requires some type of map of the surface. Reliable, efficient, and cost effective techniques for mapping a concrete surface are desired.

US20180004217A1 discloses a method for mapping an area for processing by autonomous robot vehicles but does not fully solve the challenges involved.

JP 2020060021 A shows an automated concrete surface processing machine which comprises an advanced lidar device configured to search in a wide angle. The machine is arranged to determine a boundary of the concrete surface based on the output from the lidar.

WO 2020102458 A1 shows an autonomous power trowel machine. The machine comprises an advanced sensor arrangement configured to monitor machine surroundings. The sensor arrangement comprises lidar sensors, a stereoscopic camera array as well as depth/odometry camera array. The output from the sensors is used to navigate the machine on the concrete surface.

There is a need for less complex reduced cost devices and methods for mapping out a boundary geometry of, e.g., a concrete surface.

SUMMARY

It is an object of the present disclosure to provide improved concrete surface processing machines arranged for automated or remote controlled processing of a concrete surface.

This object is obtained by a concrete surface processing machine for processing a concrete surface. The concrete surface processing machine is arranged to be supported on the concrete surface by one or more support elements extending in a base plane of the machine parallel to the concrete surface. The concrete surface processing machine is arranged to rotate about an axis normal to the base plane by the one or more support elements and comprises a control unit connected to at least one laser range finder arranged pointing in a fixed direction from the concrete surface processing machine. The control unit is arranged to determine a boundary geometry of the concrete surface based on a sequence of ranges obtained by the laser range finder during the rotation about the axis normal to the base plane.

Since the entire concrete surface processing machine rotates, a fixed direction narrow beam laser range finder mounted on the machine will also rotate. Thus, the fixed direction laser range finder will scan the environment around the machine just like a much more expensive and complex omni-scanning lidar device would. The arrangement provides a robust and low cost laser scanning capability which may support applications such as simultaneous localization and mapping (SLAM) and obstacle detection. The laser range finder emits a single beam of light in a fixed direction to measure the distance to the first point in space that the beam hits, i.e., the laser range finder provides a single distance value per measurement cycle. The hardware and software comprised in this type of device is considerably less complex and costly compared to a lidar sensor which scans an environment to generate a point cloud of several distance measurements, often with associated angles. The ability to scan the surrounding environment is instead obtained by rotating the entire machine.

According to aspects, the concrete surface processing machine further comprises any of an electronic compass, a gyroscope and/or an inertial measurement unit, IMU, arranged to determine an angle of rotation of the concrete surface processing machine and the control unit is arranged to associate each determined range by the laser range finder to a respective angle of rotation of the concrete surface processing machine. These additional sensor devices simplify, e.g., SLAM implementations, and may reduce the necessary computational burden on the control unit.

According to aspects, the control unit is arranged to obtain a position of the machine on the surface, and to associate each determined range to a respective position of the machine on the surface. This further simplifies SLAM implementations since the location is obtained with reduced computational burden.

According to aspects, the concrete surface processing machine comprises a plurality of laser range finders arranged pointing in different respective directions from the concrete surface processing machine. This means that more range data is obtained each revolution of the machine, which is an advantage since it improves the accuracy of, e.g., SLAM applications. A first laser range finder in such a plurality of laser range finders is optionally configured for detecting range at a higher resolution compared to a second laser range finder in the plurality of laser range finders. This means that the machine is able to obtain both high and low resolution ranges simultaneously. The low resolution range finder is most likely associated with a better range capability compared to the high resolution range finder. Consequently, the machine is able to obtain long range distance measurement capability and also high resolution short range distance measurement capability. In other words, the first laser range finder in the plurality of laser range finders is optionally configured for detecting range at a shorter distance compared to the second laser range finder in the plurality of laser range finders. One or more laser range finders in the plurality of laser range finders is also optionally configured in a different directional attitude compared to another laser range finder in the plurality of laser range finders. This improves the joint field of view of the laser range finders. Also, at least one laser range finder may be arranged to scan in an elevation direction to further improve the field of view of the plurality of laser range finders.

According to aspects, the control unit is arranged to share the sequence of ranges determined by the at least one range finder with a remote device and/or with other concrete surface processing machines located on the concrete surface. By sharing ranges between machines, and/or between machine and a remote device such as a processing station or remote server, computational resources increase, and joint processing of the distance data becomes available. For instance, in a SLAM application, each machine may exchange its estimated location and map with other machines, which allows the machines to make use of the data from other machines in addition to its own gathered data.

According to aspects, the concrete surface processing machine comprises one or more vision-based sensors and the control unit is arranged to communicate data from the vision-based sensors to a remote device. These vision-based sensors allow the machine to inspect the concrete surface in addition to, e.g., mapping the surface.

According to aspects, the concrete surface processing machine comprises a suction device arranged to collect dust from the concrete surface, and also a dust container for holding an amount of collected dust. Thus, a dust extraction machine comprising integrated ranging capability is provided. For instance, the machine may be a vacuum cleaner which also is able to map out a concrete surface.

There is also disclosed herein concrete surface processing systems comprising a plurality of concrete surface processing machines according to the above, and optionally also a remote device arranged communicatively coupled to at least one of the concrete surface processing machines.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where

FIG. 12 schematically illustrates a surface inspection system;

FIGS. 13A-B show example concrete surface processing control devices;

FIG. 14 illustrates a sequence of concrete processing operations;

DETAILED DESCRIPTION

Figure 1A:
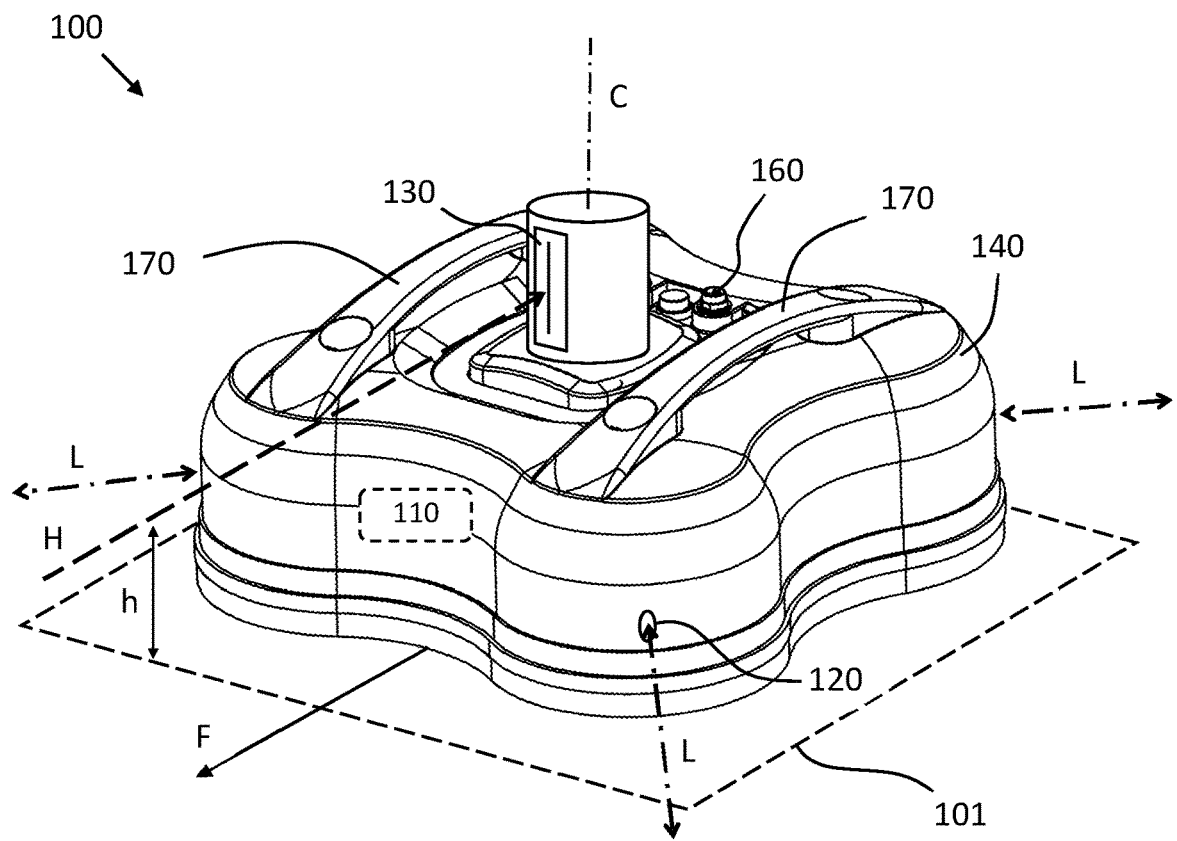
FIGS. 1A-D show an example self-propelled floor grinding machine.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1B:
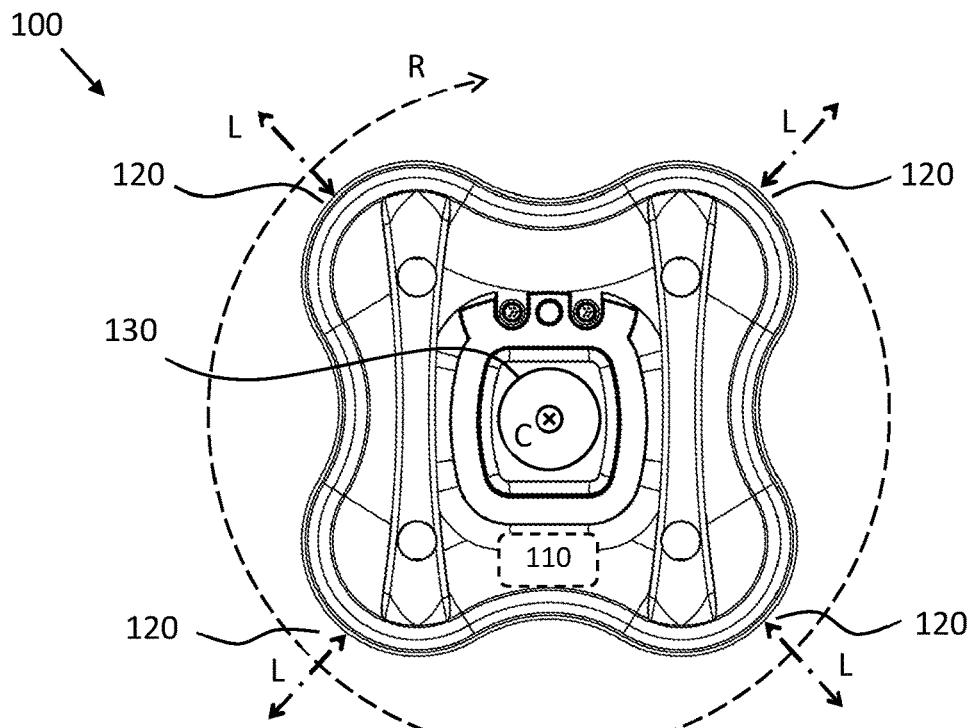
Figure 1C:
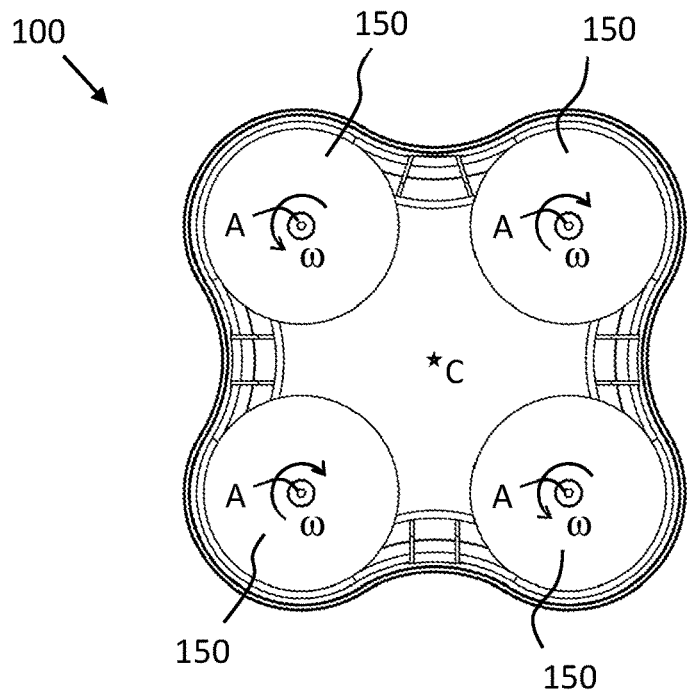

FIGS. 1A-D illustrate a machine 100 for processing concrete surfaces. The machine is supported on the concrete surface by four rotatable tool heads. Each tool head comprises a tool such as a grinding disc or the like, which is held by a tool carrier 150. This particular machine comprises four tool carriers 150 arranged in a square configuration about a machine centroid C, as illustrated in FIG. 1C. An example machine 600 comprising three tool carriers will be discussed in more detail below in connection to FIG. 6, and more than four tool carriers can also be used. The tool heads arranged to process the concrete surface extend in a base plane 101 of the machine 100. This base plane coincides with the concrete surface to be processed during operation of the machine 100. In other words, the base plane essentially constitutes the bottom surface of the machine 100.

This particular machine 100 differs from known machines in that it is relatively small in both size and weight and does not comprise any manual control means such as a manual control handle or the like which an operator can use to steer the machine. Instead, this machine is self-propelled and comprises an on-board control unit 110, which control the various operations of the machine without an operator having to go near the machine. The control unit 110 will be discussed in more detail below in connection to FIG. 16. An example machine, like the machine 100 illustrated in FIGS. 1A-D, may be associated with a total weight less than 30 kg, and preferably no more than 25 kg. The machine footprint, i.e., the part of the surface 310 covered by the grinder, is comprised in a square of dimensions 100 cm by 100 cm, and preferably no more than 70 cm by 70 cm. The machine 100 is light enough to be carried by an operator, e.g., by the handles 170 arranged on the cover body 140 of the machine. This means that the machine is very easy to deploy and can be moved between work-sites in a convenient manner, e.g., in the back of a truck of even a small car.

The machines discussed herein may be used for any of smoothing the concrete surface, troweling the concrete surface, grinding the concrete surface, and/or polishing the concrete surface. Thus, the machine 100 with the tool carriers 150 can be used for different types of concrete processing operations, such as troweling and grinding, by a convenient replacement of the tools on the rotatable tool carriers 150.

The machine 100 shown in FIGS. 1A-C may conveniently be equipped for floor grinding or floor polishing. The tool carriers 150 then hold tools arranged for abrasive operation, such as diamond tools for abrading the concrete surface. The abrasive tools can be of varying grit for different operations, i.e., course grit for leveling and fine grit for polishing. These tools may also be referred to as grinding heads.

Figure 1D:
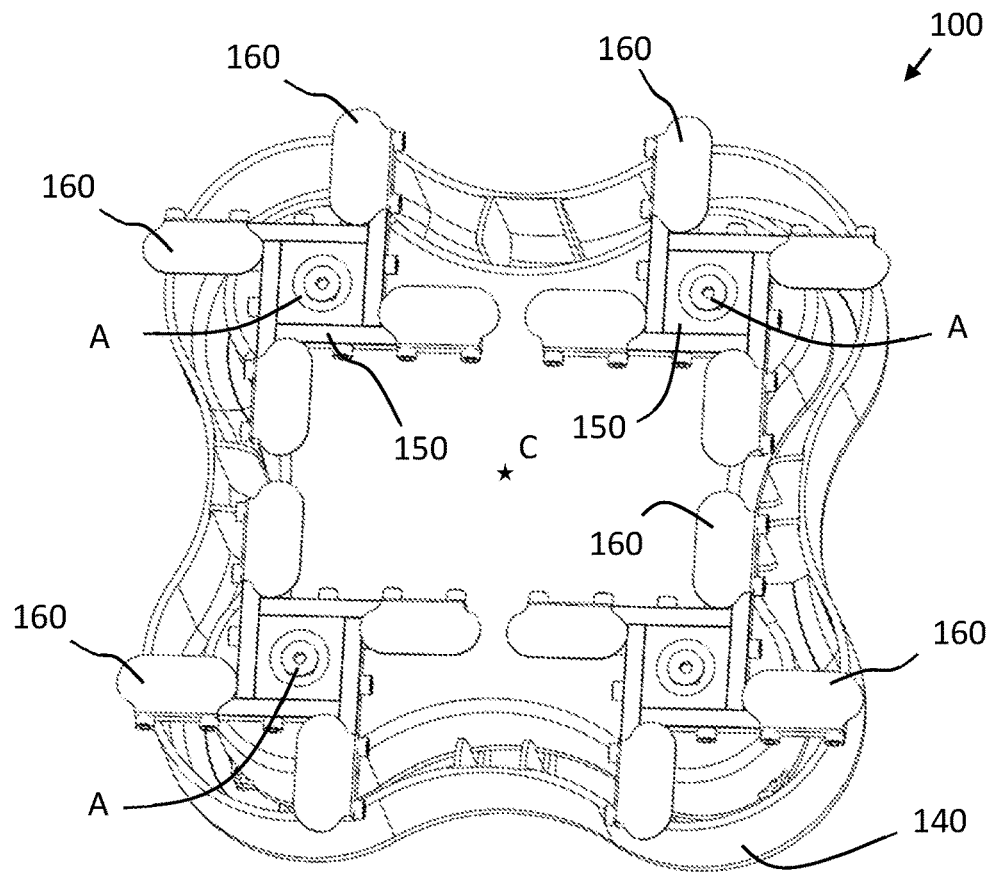

Tool carriers holding tools for a troweling operation, i.e., troweling blades 160 are shown in FIG. 1D. Similar tool carriers may be used to hold brushes on a dust collecting machine. Machines with dust collecting ability will be discussed below in connection to FIG. 9.

In general, a tool carrier is a structure arranged to hold a concrete processing tool such as a grinding disc or a set of troweling blades. A tool carrier with an attached tool may be referred to as a tool head. A grinding head is a tool head arranged for grinding or polishing a concrete surface, while a troweling head is a tool head arranged for a troweling operation.

The tool carriers 150 can also be equipped with soft or resilient discs, such as rubber discs, which are designed to provide self-locomotion with a minimum degree of damage to the concrete surface. These transportation mode discs can be fitted to the machine in case the machine needs to traverse a sensitive concrete surface which has not fully matured yet. The radius of the discs may be configured to be larger than the radius of the grinding tools, to reduce impact to the concrete surface.

The transportation mode discs can also be used by the machine for surveying a concrete surface, i.e., by using one or more sensors configured to measure one or more properties of the concrete surface, such as any of a radar sensor, a vision-based sensor, and/or a lidar sensor configured to detect scratch marks, uneven surface segments, discoloration, or damage in the concrete surface such as cracks. The one or more sensors may also comprise a surface temperature sensor and/or a moisture sensor, where the control unit is arranged to determine a degree of concrete maturity associated with a segment of the concrete surface. The concrete maturity level can, e.g., be determined from a look-up table indexed by temperature and moisture level, or just temperature or moisture. Normally, the concrete maturity level can be determined with sufficient accuracy from temperature alone, although moisture data may improve on the estimation accuracy in some case. These applications will be discussed in more detail below.

Data from a moisture sensor may also be useful in determining when to apply chemicals to the concrete surface, e.g., to prevent formation of coloring differences over the surface. Some forms of polishing operations require that the concrete surface is associated with a moisture level below a threshold value. For instance, the residual moisture of the concrete surface may be required to be below about 4 CM %, otherwise coloring differences could appear later. CM stands for "Carbide Method". This is one of several scales of measurement used when measuring moisture in concrete.

The machine 100 optionally comprises a cover body 140 with one or more proximity sensors and/or impact sensors configured to detect when the cover body approaches and/or comes into contact with an obstacle. The machine control unit 110 may then be arranged to perform a situation avoidance maneuver in response to the one or more sensors detecting proximity and/or contact with the obstacle. This sensory system can be configured to halt the machine when it comes into contact with an obstacle, or even before it actually hits the obstacle. Pressure sensors can be used to detect when the body hits an obstacle, while radar sensors and/or ultrasound sensors can be arranged to detect when an obstacle is about to be hit by the machine. The situation avoidance maneuver may comprise bringing the grinder to a stop, or possibly executing an avoidance maneuver to avoid colliding with the obstacle.

The machine 100 is preferably although not necessarily battery powered or powered by one or more fuel cells. Electrical connectors 160 can be arranged on the top side of the machine for convenient access by a battery charger cable.

For larger jobs, i.e., to process larger surfaces, a plurality of machines 100 can be used in a floor grinding system. This type of system will be discussed in more detail below in connection to FIGS. 8 and 10.

The machines discussed herein comprise various features and abilities. Among these features is an ability to determine a height of the concrete surface on which the machine is currently supported, by a relatively low cost linear photo sensor. This allows the machine, or an external control unit connected to the machine, to generate a topology map over the concrete surface. This topology map indicates, e.g., sections of the concrete surface which are higher or lower than the average surface height.

Another interesting ability is a simultaneous localization and mapping function. A key component of this feature is a laser range finder arranged pointing in a fixed direction from the machine. By rotating the entire machine about an axle normal to the concrete surface, an omnidirectional image of the surroundings is generated. The data obtained from this relatively low cost sensor is similar to that obtained from a 360 degree lidar scanner, although this is a much more expensive sensor.

The laser range finder is preferably a single-beam laser range finder configured to emit a single beam of light in a fixed direction. The laser range finder is also arranged to determine a single range value per measurement scan. Thus, it is appreciated that the laser range finders discussed herein are inherently different from advanced lidar arrangements that acquire several ranges with associated angles per measurement scan. Despite the beam of the laser range finder being narrow, it will eventually spread over long distances due to the divergence of the laser beam, as well as due to scintillation and beam wander effects, caused by the presence of air bubbles in the air acting as lenses ranging in size from microscopic to roughly half the height of the laser beam's path above the earth. However, for the distances relevant here, the angular spread of the laser range finder is well below one degree, and often well below a tenth of a degree in angular spread.

The laser range finder is a fixed direction laser range finder, meaning that it acquires a distance to the closest object along its fixed pointing direction without associating an angle to the measurement. Thus, the laser range finders discussed herein are not able to scan an environment on their own, as a lidar system often does.

The lack of ability of the laser range finder to scan the surroundings of the concrete surface processing machine is compensated for by the fact that the entire concrete surface processing machine is arranged to rotate R about the axis C normal to the base plane 101, as indicated in FIG. 1B. Thus, in a normal mode of operation, the machine 100 rotates about the axis C while moving around on the concrete surface.

Thus, there is disclosed herein a method for processing a concrete surface by a concrete surface processing machine. The method comprises rotating the machine about an axis C normal to a base plane 101 of the machine while making a series of range measurements in a fixed direction from the machine by at least one laser range finder 120 arranged pointing in the fixed direction from the concrete surface processing machine, and determining a boundary geometry of the concrete surface based on a sequence of ranges obtained by the laser range finder during the rotation R about the axis C.

A third feature of the machines disclosed herein is a concrete surface inspection feature. This feature allows a machine to inspect the concrete surface and to determine one or more quality parameters of the surface, such as if the surface comprises scratch marks or cracks.

A fourth feature of the concrete surface processing machines discussed herein is a dust collecting ability. By arranging suction devices and dust containers on the machine, an ability to collect dust from the concrete surface is obtained.

A fifth feature of the concrete surface processing machines discussed herein is the ability to dispense a mist of, e.g., water, in connection to the concrete surface processing. The purpose of this feature is to keep the abrasive tools cool and to prevent over-heating which may result in tool glazing and inefficient concrete processing.

It is appreciated that all of these abilities may be freely combined in the concrete surface processing machine. Thus, although some features are discussed in combination, this does not mean that they cannot be used separately, as will be readily understood by the skilled person.

The machines discussed herein may be powered by one or more rechargeable batteries configured to power one or more electric machines on the machine 100. These batteries may advantageously be charged using an inductive charging circuit arranged to interface with an external power source and to recharge the one or more rechargeable batteries. For instance, a coil may be embedded directly into the concrete surface which is to be processed by the machine. An example of such a power source 840 will be discussed in more detail below in connection to FIG. 8. The machine can then access the power source as needed, much like a robotic lawn mower.

The concrete surface processing machines disclosed herein are arranged to be supported on the concrete surface by one or more support elements which may be tool carriers 150 or wheels 1110 as will be discussed below in connection to FIG. 11. The support elements extend in a base plane 101 of the machine parallel to the concrete surface 310.

The concrete surface processing machines may comprise a control unit 110 connected to at least one linear photo sensor 130 or linear image sensor extending transversally to the base plane 101. This linear photo sensor is arranged to register an incoming laser beam, such as an incoming laser beam from a rotary laser. Rotary lasers are devices arranged to generate a laser beam parallel to some reference surface. Rotary lasers which generate horizontally aligned laser beams are often referred to as laser levels.

Basically, a linear photo sensor is a vertical array of photo sensors. A laser beam hitting a photo sensor in the array will trigger generation of a signal from that photo sensor. A control unit 110 connected to the linear photo sensor can therefore detect the height at which a laser beam strikes the linear photo sensor. A linear photo sensor may also comprise photo sensors arranged in matrix configuration, i.e., in two or more adjacent arrays of photo sensing elements. Such as array may not only detect the height at which an incoming laser beam strikes the array but may potentially also detect a tilt of the machine relative to, e.g., the horizontal plane.

With reference to FIG. 1A, the control unit 110 is arranged to detect a height h of an incoming laser beam H relative to the base plane 101, or relative to some configured target height value, based on a point of incidence of the incoming laser beam H on the linear photo sensor 130. Rotary lasers are commonly used to establish a horizontal frame of reference at, e.g., construction sites and the like. The rotary laser is deployed at a surface and aligned to transmit a rotating laser beam parallel to the surface. The combination of the linear photo sensor 130 and the control unit 110 arranged to detect the height h enables the machine 100 to determine a surface topology of the concrete surface. By moving around on the concrete surface and measuring the height h, a topology map can be created. This topology map can then be used to plan or control concrete surface processing in order to arrive at a desired result, such as a flat concrete surface, or a concrete surface which has been grinded down by an equal amount over the surface.

According to aspects, the control unit 110 is arranged to average the detected height h over time to determine an average detected height. The control unit 110 may also receive height data from other machines located on the same concrete surface. For instance, a swarm of concrete surface processing machines (see FIG. 8 discussed below) may be used to process the concrete surface. These machines may then collaborate to generate a topology map of the concrete surface with higher accuracy due to the averaging. This averaging of course requires that the height data be time-stamped and tagged with location. The time stamp can be used to weight the height data, where older data items are given less weight, since it becomes more likely that the section of surface has been processed by other machines since the height measurement was made.

One or more linear photo sensors 130 may be arranged on a part of the machine extending upwards from the concrete surface, as shown in FIG. 1A. Alternatively, or as a complement, one or more of the linear photo sensors 130 may also be arranged integrated with the cover 140, as illustrated in FIG. 2.

Figure 2:
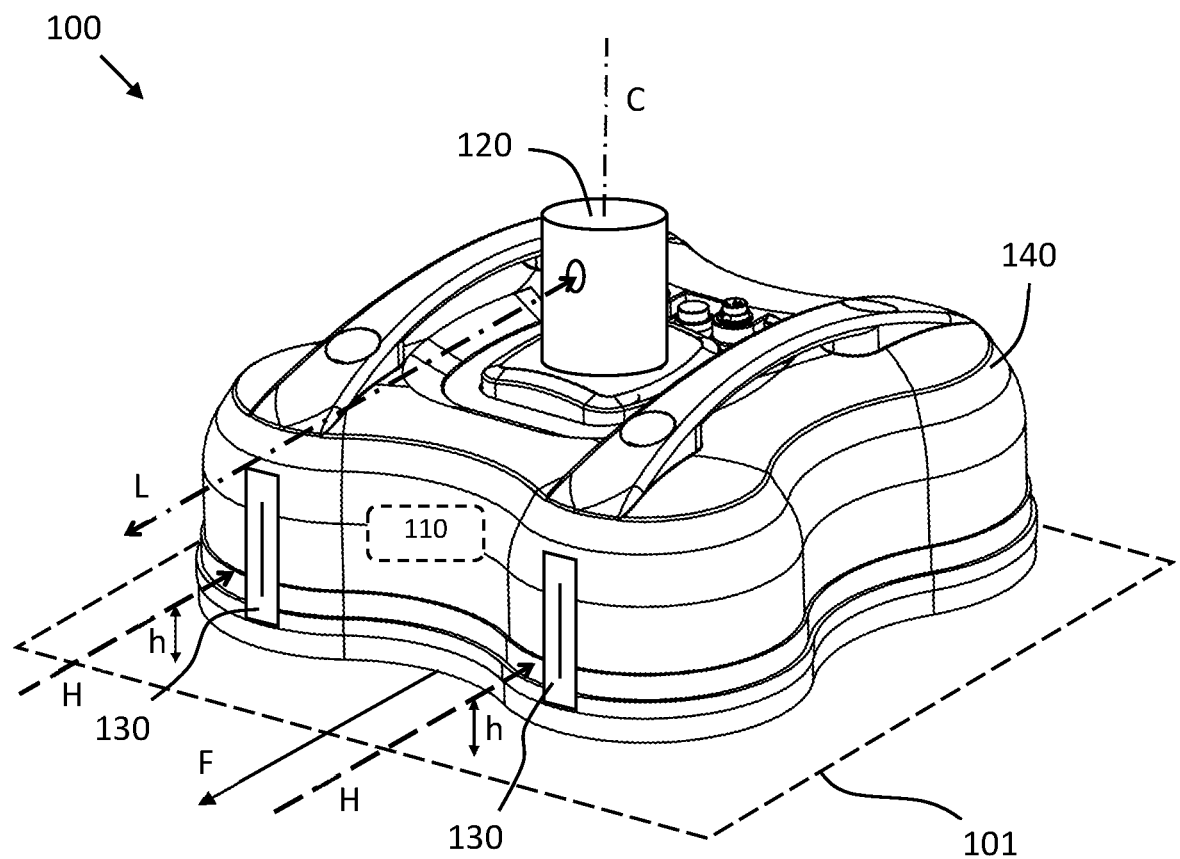
FIG. 2 shows another example self-propelled floor grinding machine.

The concrete surface processing machine illustrated in FIG. 2 comprises two linear photo sensors arranged separated along a line parallel to the base plane 101. The control unit 110 can then be arranged to determine a tilt of the machine with respect to the concrete surface based on a difference in the detected height h of the incoming laser beam H at the two linear photo sensors.

With reference to FIG. 1B, the concrete surface processing machine 100 may also be arranged to rotate R about an axis C normal to the base plane 101 by the one or more support elements 150, 1110. The axis C may be a central axis of the machine 100, or some other axis. An eccentric rotation pattern is of course also possible. If the control unit 110 is connected to at least one laser range finder 120 arranged pointing in a fixed direction from the concrete surface processing machine, a function similar to that of a 360 degree lidar device is obtained, albeit at a much lower cost.

As the machine 100 rotates about the axis C, the laser range finder scans the surrounding environment and determines the range to the nearest object in all directions. Thus, an "image" or representation of the surrounding environment is obtained. The control unit 110 can then be arranged to determine a boundary geometry 320 of the concrete surface 310 based on a sequence of ranges obtained by the laser range finder 120. It is appreciated that each complete revolution by the machine generates a sequence of ranges, which sequence of ranges will repeat itself if the machine remains at a given location or will shift slightly between full rotations if the machine moves in some direction. The control unit 110 may perform simultaneous localization and mapping (SLAM) based on the sequence of rangers obtained from the laser range finder. Different SLAM methods will be discussed in more detail below in connection to FIG. 3.

The concrete surface processing machine 100 may also comprise a downward looking sensor (not shown in FIGS. 1A-D), such as a downward looking radar transceiver or laser rangefinder, arranged to detect a distance to the concrete surface 310 along a normal vector to the concrete surface. This downward looking rangefinder essentially measures the height of the support elements 150 mounted on the machine. If the machine is used for grinding, then the detected range by the downward looking rangefinder will decrease over time as the grinding tools get worn down. The control unit 110 may therefore adjust the detected height h of the concrete surface based on the detected distance to the concrete surface 310. Thus, tool type and tool wear will have little or no effect on the detected height h, which means that a topology map over the concrete surface 310 will be generated independently of tool wear and thus with higher accuracy compared to the case where tool wear is not accounted for. It is also appreciated that this sensor can be used to adjust the determined height for different types of tools. There is no longer a need to configure an exact tool height a-priori since the control unit 110 can use the data from the downward looking sensor to compensate for variation in tool height.

According to an example use-case, the machine 100 may first be calibrated without tools attached by placing it on the concrete surface 310. The downward looking sensor then determines the distance to the surface without tools attached. The height of the tool, after it has been attached, can then be determined based on a difference in height detected by the sensor.

The control unit 110 is optionally also arranged to trigger generation of a signal indicating a tool wear in dependence of the detected distance to the concrete surface 310. Thus, by constantly monitoring the distance from the sensor to the concrete surface, the control unit can detect when a given tool has been worn down enough to merit tool replacement. This feature is particularly useful when grinding concrete surfaces using abrasive tools. The control unit 110 may, e.g., trigger transmission of a tool replacement notification signal to a remote device, such as a remote control device of other type of wireless device. Examples of such devices 1310, 1320 are shown in FIGS. 13A and 13B. Alternatively, or in addition to the detected distance, the control unit 110 comprises a timer which measures to total accumulated grinding time for a given tool. The control unit can determine when a given tool has been worn down enough to merit tool replacement by comparing the timer value to a preconfigured usage time associated with a given tool.

Figure 3:
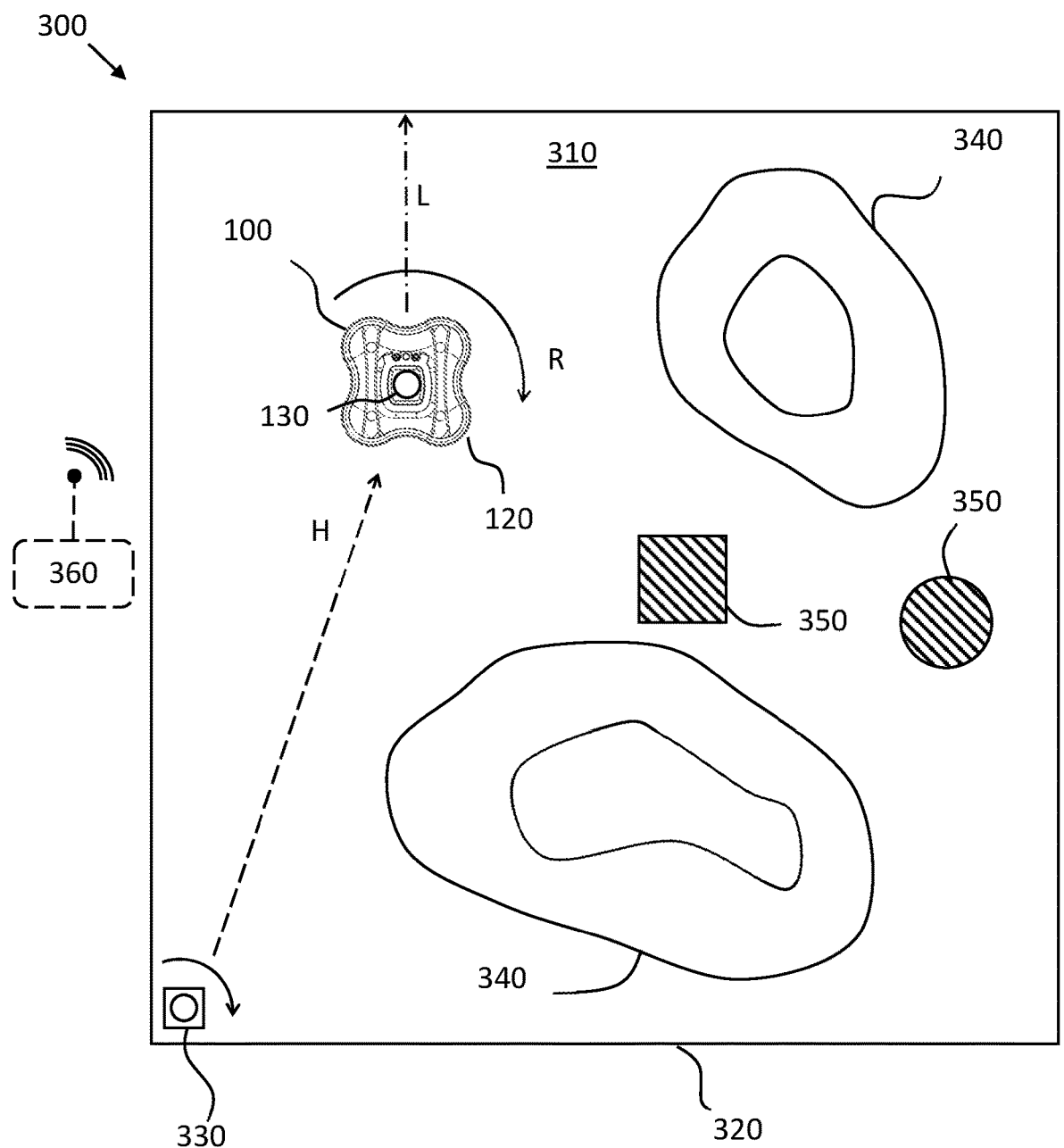
FIG. 3 schematically illustrates a mapping system.
Figure 3:
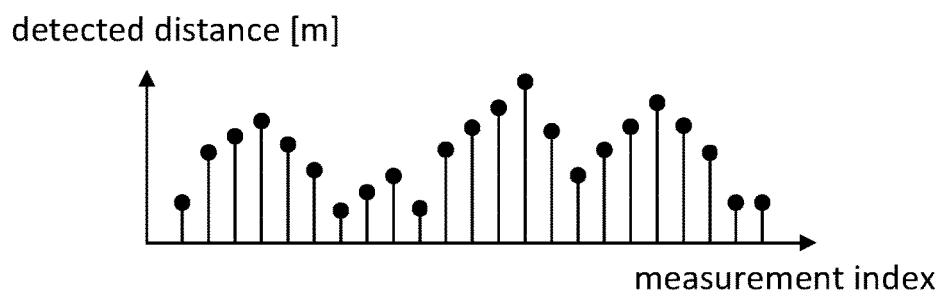

The machine 100 may comprise a plurality of laser range finders 120 arranged pointing in different respective directions from the concrete surface processing machine (four laser range finders 120 are shown in FIG. 1B), or just a single laser range finder (as illustrated in FIG. 3, discussed below). The advantage of having more than one laser range finder is, of course, that more distance measurements can be made, which allows a greater degree of averaging and therefore also an increased accuracy in the range estimates. The range finders are preferably arranged integrated in the cover body 140, as shown in FIG. 1A. However, one or more laser range finders can also be arranged in, e.g., a central housing extending upwards from the machine as shown in FIG. 2. It is appreciated that the laser range finders can be mounted in various locations on the machine 100.

Any of the machines disclosed herein may comprise more than one range finder, and in particular two or more different types of laser range finders. For instance, a first laser range finder in the plurality of laser range finders may be configured for detecting range at a higher resolution compared to a second laser range finder in the plurality of laser range finders. The first laser range finder in the plurality of laser range finders may perhaps be configured for detecting range at a shorter distance compared to a second laser range finder in the plurality of laser range finders, but in return provide range data with higher resolution. This way high resolution close range distance data can be obtained from some of the laser range finders, while other range finders provide a lower resolution but increased range.

Optionally, one laser range finder in the plurality of laser range finders is configured in a different directional attitude compared to another laser range finder in the plurality of laser range finders 120. This way a better view of the surrounding environment can be obtained in the altitude dimension, i.e., in the dimension normal to the concrete surface. Some obstacles may, for instance, be protruding from a wall, where they cannot be seen by a laser range finder directed parallel to the concrete surface and close to the surface. However, a laser range finder directed with an attitude, i.e., pointing with an angle upwards from the concrete surface may be able to detect the obstacle. It is appreciated that obstacles located distanced from the concrete surface by a distance larger than a total height of the machine 100 will not present an obstacle to the machine. However, such obstacles may still be of interest if a map of the area is generated.

Optionally, at least one laser range finder 120 is arranged to scan in an elevation direction. This means that the laser range finder has an attitude which changes over time, preferably rapidly, to generate distance data over a range of attitude angles.

FIG. 3 shows an example application 300 of a concrete surface processing machine 100 which is processing a concrete surface 310. The surface is delimited by a boundary 320, this boundary can be a wall or some other type of structure, or it can be an imaginary boundary marked by boundary markers, such as laser reflectors (mirrors), radar reflectors, visual markers, or other types of markers. Thus, an operator can define the area to be mapped and processed, or a natural boundary like the walls of a room can be used to delimit the area.

A rotary laser 330 is deployed on the concrete surface. This rotary laser generates a laser beam H which impinges on the machine 100. Thus, the machine 100 may determine a height of the concrete surface section where the machine is located by means of the linear photo sensor 130 discussed above.

The height of the concrete surface 310 varies as illustrated by the equidistance lines 340, i.e., the surface is not perfectly flat. Some obstacles 350 are also present on the surface. The machines disclosed herein can be used to generate a topology map of the surface, including detecting the boundary geometry 320 and the differences in height 340 over the surface. This topology map can then be used by an operator to plan a concrete processing operation, and/or to evaluate the result of an already performed concrete processing operation. As will be discussed in more detail below, the concrete surface processing machine disclosed herein can also be used to evaluate a quality of the concrete surface, such as if the concrete surface comprises scratch marks, cracks, pores, or if the gloss is not according to specification. It is appreciated that obstacles, such as crates and other temporarily deployed tools, form part of the boundary geometry.

According to some aspects, the control unit 110 is arranged to obtain a position of the machine on the surface, and to associate the height h to the position on the surface. This data essentially constitutes a topology map of the surface. The topology map data can either be used internally by the machine 100, and it can also be communicated to a remote device 360, such as one of the wireless devices 1310, 1320 illustrated in FIGS. 13A and 13B.

According to some aspects, the control unit 110 is arranged to transmit topology information comprising the height h to a remote device 360, or to some other type of wireless device 1310, 1320 like those illustrated in FIGS. 13A and 13B.

One interesting application where the machine 100 can be applied with advantage is an autonomous concrete processing operation. The control unit 110 is then arranged to control a self-locomotion of the machine based on a difference between the detected height h and a desired height over the surface. Thus, as the machine 100 moves over the surface which can be either autonomously mapped using the laser range finders or described by a pre-configured map accessible from the control unit 110, the current height h of the surface is detected and compared to the desired surface height. If there is a discrepancy between the current height and the desired height, the machine will process the surface until this discrepancy is reduced to a value below a tolerance setting. The concrete processing machine can then move across the surface and process it until a desired result has been obtained.

The desired height may be an absolute pre-configured height over some horizontal reference plane, in which case the machine 100 will process the surface until it is absolutely flat, or at least until it has a flatness below the tolerance level. Alternatively, the desired height is a relative height determined in dependence of an initially detected height. This means that a fixed amount of material is to be removed from the concrete surface. For instance, if the concrete processing operation targets a glossy finish, but total flatness is not so important, then the machine can be configured to remove, say 1-5 mm of material from the surface, where about 2-3 mm may be a preferred value.

There are several ways in which the control unit 110 can establish a map of the concrete surface, comprising information about the boundary 320 and optionally also of any obstacles 350 present in the area.

According to some aspects, the control unit 110 comprises means for positioning the machine on the surface, such as a GPS or some form of indoor positioning system, e.g., based on radio beacons or lasers. In other words, the control unit 110 is optionally arranged to obtain a position of the machine on the surface 310, and to associate each determined range (or each determined sequence of ranges if the machine remains stationary while rotating) to a respective position of the machine on the surface. The machine may further comprise any of an electronic compass, a gyroscope and/or an inertial measurement unit, IMU, arranged to determine an angle of rotation of the concrete surface processing machine, wherein the control unit 110 is arranged to associate each determined range by the laser range finder to a respective angle of rotation of the concrete surface processing machine. Thus, the control unit is able to associate each range measurement by the laser range finder to an angle originating from a location on the surface, which means that the control unit 110 can easily establish a map over the surface.

The control unit 110 is optionally also arranged to determine a rotation velocity of the machine based on a frequency analysis of the determined ranges from the range finder. This is possible since the sequences of determined ranges will exhibit a repetitive pattern as the machine completes full rotations about the axle of rotation. By applying a frequency analysis to the determined range data, such as a Fast Fourier Transform or the like, the repetition frequency can be determined and consequently a rotational velocity of the machine 100 can be determined from the identified repetition frequency.

More advanced methods for simultaneous localization and mapping are known.

According to some optional aspects, the machine comprises one or more vision-based sensors. The control unit 110 can then be arranged to record vision sensor data in dependence of machine pose and location, and potentially also communicate data from the vision-based sensors to a remote device 360, as shown in FIG. 3. This data may, e.g., be used by an operator in a virtual reality (VR) application, where the operator may inspect the concrete surface without physically visiting the location. Techniques for VR are known and will therefore not be discussed in more detail herein.

Figure 4:
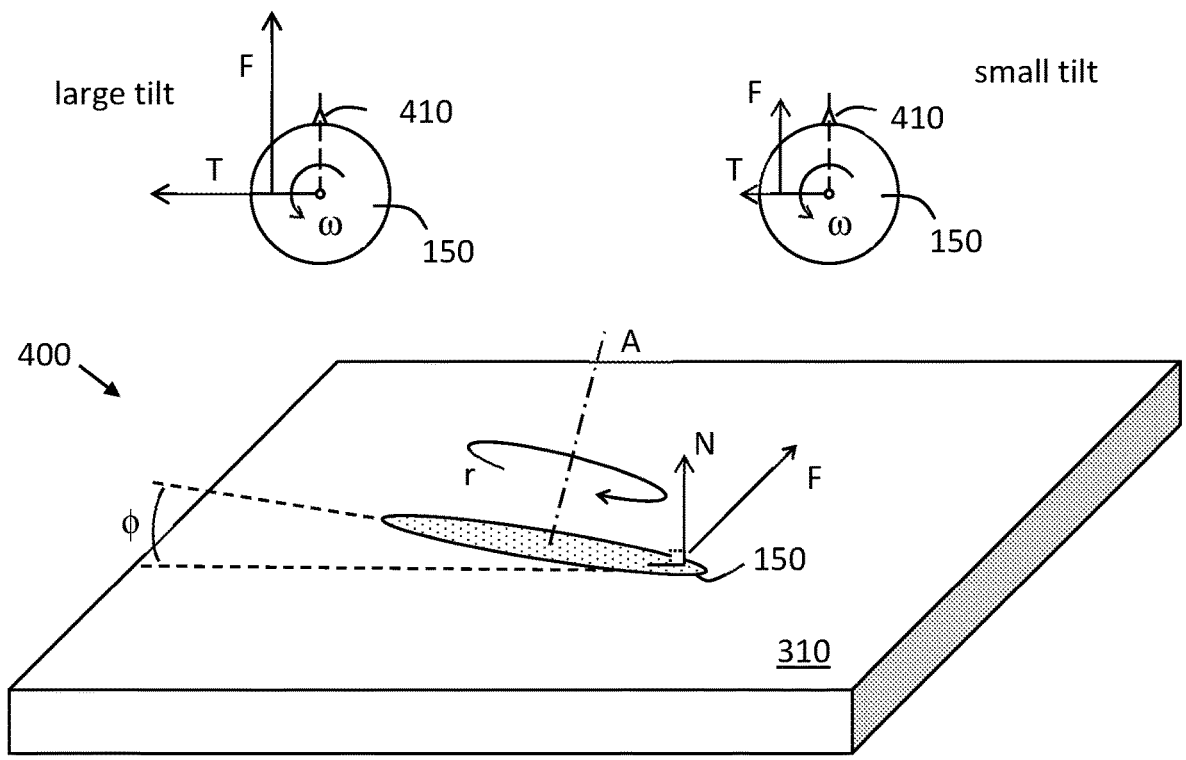
FIGS. 4-5 illustrate a principle of machine locomotion.

With reference to FIG. 4, the machine 100 is self-propelled to move in a direction F in a controlled manner. This locomotion is generated by tilting one or more of the tool carrier axles A at an angle φ relative to the base plane 101. This tilting generates a difference in normal force N over the tool carrier such that the rotating motion r by the tool carrier 110 generates a force F in a direction perpendicular to the tilting direction.

This tilting may be achieved by tilting the entire drive unit. Alternatively, a pulley or the like fixedly connected to the tool carrier 150 can be tilted to obtain the desired effect.

Figure 5:
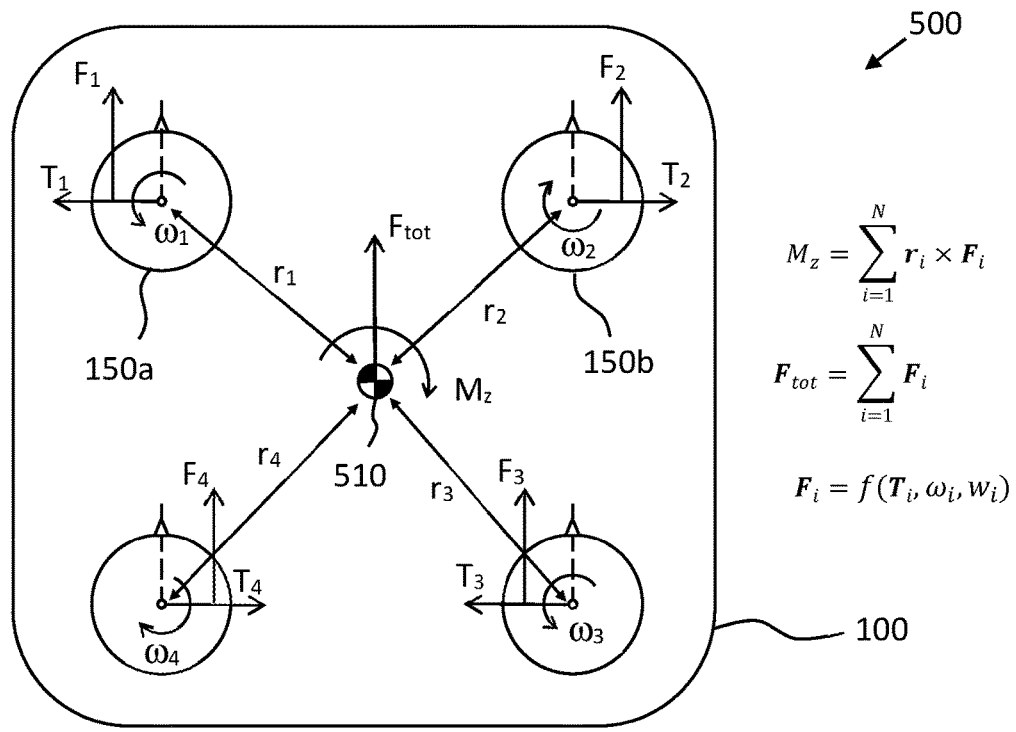

FIG. 5 illustrates the tilting principle in more detail. Here, the tilt is illustrated by vector T in two dimensions. The generated force F is perpendicular to the direction of the tilt T, and the magnitude of the force depends on the level of tilt, such that a large tilt results in a relatively large force F while a smaller tilt, i.e., by a smaller angle, results in a smaller force F. The rotational velocity w also affects the generated force. For most grinding discs, the generated force increases more or less linearly with rotational speed up to a peak where the generated force starts to drop with rotational velocity. The tool head type in use and the maturity level of the concrete, i.e., the friction between tool head and concrete surface also has an effect on the magnitude of the generated force F. The control unit 110 may thus control the generated forces by controlling the direction of the tilt and the magnitude of the tilt by sending control signals to the tilt actuators.

This propulsion concept involving tool head tilting is associated with several advantages. For instance, since the forces are generated by tilting, the tool carriers can be arranged to rotate at the same absolute rotational velocity w. This means that the electric machines can be optimized for a given fixed speed, where no speed control arrangements, or at least no complicated speed control arrangements, are required. Having at least three tool heads provides a level of stability to the machine which makes it suitable for operator-less control such as by remote control or autonomous operation. However, four or more tool heads are preferred since this also simplifies control of the propulsion and increases machine stability further.

At least one of the tool carriers 150 may furthermore be arranged to rotate with a variable rotational velocity ω, and the control unit can be arranged to control the variable rotational velocity ω of the tool head by the control signal to provide locomotion by the machine relative to the surface. It is appreciated that the speed of rotation has a similar effect on the machine force distribution as the normal load on the tool heads. Thus, the control unit 110 can generate a control signal to control rotational velocity and thereby obtain a desired motion by the machine relative to the concrete surface.

As illustrated in FIG. 5, four tool carrier axes A may advantageously be arranged tiltable T with respect to the base plane 101. This means that four respective locomotion forces $F_1$, $F_2$, $F_3$, $F_4$ are generated. A combined total force $F_{total}$ is generated to provide locomotion and also a torque $M_z$ about the machine mass center 510. A particular advantage with the arrangement 500 in FIG. 5 is that the tool heads are arranged in pairs with opposite direction of rotation. The two tool heads in a pair provide a more straight forward motion control since they stabilize each other.

Each force $F_i$ is a two-dimensional vector force in the plane 101. Its direction is, as discussed above, determined from the direction of rotation of the tool head and by the tilt angle T, as well as by the relative load on the tool head compared to other tool heads. The magnitude of the force depends on many different factors. Some of the more important factors include the normal force which depends on the weight $w_i$ on the tool head. This normal force can be adjusted in case a variable height suspension system is installed in connection to one or more of the tool heads. Thus, at least one of the tool carriers 150 may be configured with a variable height suspension configured to adjust a normal load associated with the tool carrier.

The magnitude of the force also depends on the rotational velocity of the grinding disc as discussed above. The relationship between these factors and the generated force is given by a function $F_i = f(T_i, \omega_i, w_i)$ where $T_i$ is the two-dimensional tilt vector representing direction and magnitude of the tilt of the i-th tool head, $\omega_i$ is the rotational velocity of the i-th tool head, and $w_i$ is the weight on the i-th tool head which is indicative of the normal force of the tool head. This function is normally an approximation of the true relationship between parameters and the resulting force. This approximation can be arrived at by, e.g., a combination of analytical derivation and laboratory experimentation. A calibration routine can be carried out in order to adjust the function to match a given device and operating condition.

Generally, rotation about the mass center 510 is generated by the torque $M_z$ $$M_z = \sum_{i=1}^{N} r_i \times F_i$$

where N=4 in FIG. 5. A turning motion by the machine can be achieved by varying the forces $F_i$ such that a non-zero torque $M_z$ is generated. Thus, turning of the machine, or motion along an arcuate path, can be achieved by varying the set of tilt angles $\{arg(T_i)\}_{i=1,\ldots,4}$ or the set of tilt magnitudes $\{|T_i|\}_{i=1,\ldots,4}$ in a controlled manner, and/or by varying rotational velocity $\{\omega_i\}_{i=1,\ldots,4}$ and/or by varying normal load $\{w_i\}_{i=1,\ldots,4}$. It is appreciated that rotational velocity and weight are entirely optional control parameters. Only control of the tilt $\{T_i\}_{i=1,\ldots,4}$ is required to obtain basic functionality.

The total force $F_{tot}$ (disregarding friction forces and the like) is given by $$F_{tot} = \sum_{i=1}^{N} F_i$$

This quantity determines the direction of motion as well as the speed of the machine. The control unit 110 can be configured to generate a desired total force to move the machine in a desired direction, and/or a desired torque to rotate the floor grinder by generating one or more control signals to the different actuators on the machine 100. A combination of a non-zero total force and a non-zero torque about the mass center will generate a motion by the machine along an arcuate path. $F_{tot}$ is preferably optimized for a given floor surfacing operation by the control unit 110.

The machines disclosed herein may be associated with different modes of operation. When in a transport mode of operation the machine may be configured by the control unit 110 to move relatively fast along a straight path towards a target destination without rotating about the machine centroid. This mode of operation is preferably used when moving the machine 100 from one place to another place. The transportation mode of operation may be optimized for transporting the machine 100 without leaving marks on the concrete surface, which may not be fully matured.

The machine 100 may also be associated with a work mode or active mode of operation. This mode is used, e.g., when grinding or troweling a concrete surface. The work mode of operation may comprise a rotation about the machine centroid in combination with a forward motion. The work mode of operation may be optimized for grinding performance or for troweling performance.

The force allocation by the control unit can be performed in a number of different ways. One way to perform the force allocation is to solve the system of force equations and torque equations analytically. Another, less computationally intensive way to perform the force allocation and tool head coordination is to maintain a set of look-up tables (LUT) with suitable tilt values for different operations. Of course, these LUTs may need to be calibrated regularly.

Another method of force allocation and tool head coordination is to implement a feedback system where one or more sensors are used to detect a current motion behavior by the machine. Such sensors may comprise, e.g., any of inertial measurement units (IMU), electronic compasses, radar transceivers, global positioning system (GPS) and indoor location system transceivers. The control unit can then control the set of tilt angles $\{arg(T_i)\}_{i=1,\ldots,4}$ and/or the set of tilt magnitudes $\{|T_i|\}_{i=1,\ldots,4}$ to obtain a desired motion by the machine. A set of rules can be formulated for how to obtain a desired effect. For instance, to increase speed in the forward direction, an increased tilt can be applied as shown in FIG. 5. To reduce torque about the mass center, i.e., to drive more straight, tilt angles on one side can be changed, or tilt magnitudes on one side can be changed.

Depending on the surface processing task at hand, a limit on maximum allowable tilt angle may be imposed. This is because too large tilt angles may generate marks in the concrete surface, which of course is undesired.

Figure 6:
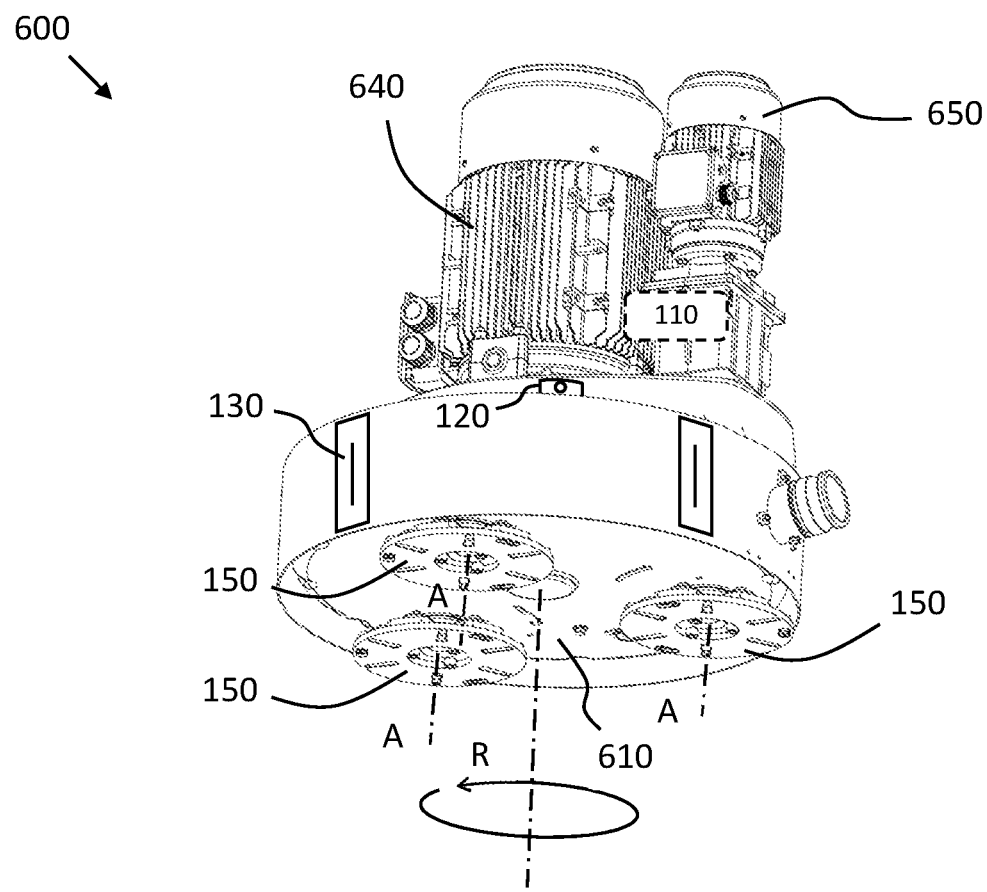
FIG. 6 shows an example floor grinding machine.

FIG. 6 illustrates another example machine 600 where the herein disclosed techniques may be used with advantage. This machine comprises three tool carriers 150, but versions with four or more tool carriers are also possible. The tool carriers 150 are arranged to be driven by a central electric machine 640 (a first motor) via a belt, chain, or gear drive arrangement. The first motor 640 is here shown as an electric machine, although a combustion engine can also be used. The entire bottom structure 610, often referred to as the "planet", is rotated R about a center axis by a second motor 650. This type of dual drive machines is previously known and will therefore not be discussed in more detail herein.

The machine 600 comprises three tool carriers 150 arranged to rotate about respective tool carrier axes A, wherein at least one tool carrier axis is arranged tiltable in two dimensions with respect to a base plane of the machine to generate locomotion by the machine relative to the surface. This tilting can be achieved, e.g., by using a set of servomechanisms and excentre members as discussed above to tilt the pulleys. However, the control of the tilting is a bit more advanced compared to the example discussed above in connection to FIG. 5, since the rotation angle of the planet must also be accounted for.

In general, a control unit 110 can be configured to distribute forces over the tool heads to obtain a desired motion by the machine 600, e.g., a given speed in a given direction, perhaps complemented by a non-zero torque to obtain a planetary motion by the machine. The control unit then considers the following relationships $$M_z = \sum_{i=1}^{N} r_i \times F_i$$

$$F_{tot} = \sum_{i=1}^{N} F_i$$

and determines a solution comprising a distribution of forces. Given a distribution of forces $\{F_i\}$, the control unit then configures tool head parameters comprising tilt angle $T_i$, and optionally also $\beta$, $\omega_i$, $w_i$ $$F_i = f(T_i, \beta, \omega_i, w_i)$$

where $\beta$ may be a function of time, $\omega_i$ is a rotational velocity of the i-th tool head, and $w_i$ is a weight associated with the i-th tool head which can be adjusted by, e.g., controlling a variable height suspension system of a tool head. It is appreciated that rotational velocity and weight are entirely optional control parameters. Only control of the tilt $\{T_i\}_{i=1,\ldots,3}$ is required to obtain basic functionality.

The planetary motion may be generated in either clockwise or counter-clockwise direction depending on the force allocation $\{F_i\}_{i=1,\ldots,3}$ and tool head coordination. The planetary motion is preferably complemented by a forward motion by the machine 800 to move across the concrete surface as it grinds the concrete surface in a controlled manner.

The machine 600 comprises any of the laser range finder 120 and/or the linear photo sensor 130. Thus, the machine 600 may be arranged to perform all of the functions discussed above in connection to the machine 100, such as determining surface height in a topology map, and boundary geometry in a SLAM method.

It has been realized that the herein disclosed machines can also be used for investigating the quality of the concrete surface 310. By arranging various sensors to determine surface quality, a concrete surface can be surveyed before the concrete processing operation starts in order to provide input to operation planning, and the result of a concrete processing operation can be determined in order to make sure that the results is as expected, i.e., meets a specification.

Figure 7:
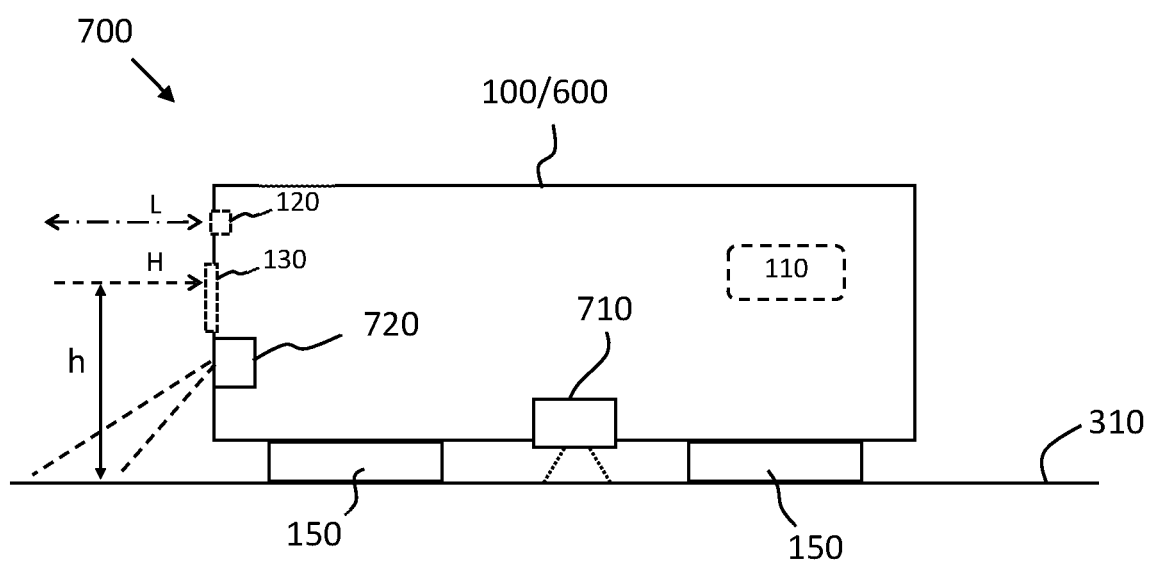
FIG. 7 schematically illustrates a machine for surface inspection.

FIG. 7 illustrates a concrete surface processing machine 700, such as any of the machine 100, 600, for processing a concrete surface 310. The machine comprises means for self-locomotion and a control unit 110 arranged to control the means for self-locomotion. The means for self-locomotion may, e.g., comprise the tiltable tool holders discussed above in connection to, e.g., FIG. 5, or driven wheels as illustrated in FIG. 11. The machine 700 comprises one or more surface quality sensors 710, 720 connected to the control unit 110 and arranged to determine a local surface quality of the concrete surface 310. The local surface quality may, e.g., be indicative of the presence of scratch marks, cracks in the surface, and/or a level of surface gloss.

The one or more surface quality sensors may comprise a three-dimensional (3D) camera sensor. The control unit 110 can detect minute scratch marks and other undesired traits in the concrete surface by the output from the 3D camera. The one or more surface quality sensors may also comprise a radar sensor and an inertial measurement unit (IMU). The control unit 110 can detect irregularities such as scratches and cracks in the surface using the radar sensor. However, the vibration in the machine is likely to have a detrimental effect on the quality of the output data from the radar sensor. Thus, the control unit 110 can be arranged to compensate the output signal from the radar sensor for vibration in the machine based on an output signal from the IMU.

The control unit 110 is furthermore arranged to control a self-locomotion of the machine to determine a plurality of local surface quality values associated with respective different locations on the concrete surface 310.

The control unit 110 may advantageously be arranged to compare the plurality of local surface quality values to a pre-configured specification, and to output a validation result based on the comparison. Thus, the machine 700 can be used to perform an initial survey of a concrete surface and determine if the surface is ready for a given type of processing. For instance, the machine 700 can be used to survey a concrete surface in order to determine if the surface is ready for processing by a finer grit, or if more processing by a courser grit abrasive tool is necessary due to the presence of scratches and the like. The machine 700 can also be used to validate the result of a concrete processing operation, i.e., to verify that an intended result has been achieved, or if additional processing is required in order to fulfil a requirement specification.

The control unit 110 is arranged to generate a desired tool selection based on the determined local surface quality values. The tool selection may be displayed on a remote device like the devices 1310, 1320 illustrated in FIGS. 13A and 13B.

As shown in FIG. 7, the machine 700 may optionally comprise any of the linear photo array for determining height h, and/or the laser range finder 120 for determining distances to surrounding objects like walls and other obstacles.

The machine 700 may be a stand-alone surface quality inspection robot which only performs the function of surveying the concrete surface using the surface quality sensors 710, 720. Alternatively, the machine 700 may be arranged to perform additional functions, such as one or more concrete processing operations comprising troweling, grinding, polishing, and the like.

The machine 700 may also be arranged to perform SLAM operations, i.e., to not only survey the quality of the concrete surface, but also perform simultaneous localization of itself on the concrete surface and mapping of the concrete surface, as discussed above in connection to, e.g., FIG. 3.

The one or more surface quality sensors may also comprise a laser scanner and/or a gloss sensor. Both laser scanners and gloss sensors are known and will therefore not be discussed in more detail herein. A radar transceiver can also be used to evaluate surface quality, and also structural integrity of the concrete below the surface. The control unit 110 can then be arranged to detect cracks and pores in the concrete surface 310 based on an output signal from the radar transceiver.

The machine 700 may further comprise a particle sensor arranged to determine an amount of particles in the air surrounding the machine. The control unit 110 may then be arranged to trigger generation of a warning signal in case the amount of particles exceeds a preconfigured threshold value.

The machine 700 may optionally also comprise a gas sensor, such as a carbon dioxide and/or carbon monoxide sensor arranged to determine an amount of carbon dioxide in the air surrounding the machine, wherein the control unit 110 is arranged to trigger generation of a warning signal in case the amount of carbon dioxide exceeds a preconfigured threshold value.

The warning signals may, e.g., be transmitted from the control unit 110 to a remote device such as the remote device 360 discussed above in connection to FIG. 3, or to a remote device such as the devices 1310, 1320 shown in FIGS. 13A and 13B. An operator may, for instance, configure an acceptable level of particles in the air, and/or level of carbon dioxide and/or level of carbon monoxide or other harmful or undesired gases, and receive a warning from the machine 700 in case the relevant level in the area goes above this threshold. The threshold levels may also be configured in dependence of construction site requirements. Of course, other air quality sensors are also possible to mount on the machine 700, such as sensors for detecting various forms of gasses, Geiger counters, and the like.

The machines 700 discussed herein may also comprise a moisture sensor and/or a temperature sensor arranged to determine a moisture level and temperature, respectively, of the concrete surface 310. The moisture and temperature data can be used to estimate a maturity level of the concrete surface, which can be used in determining when to start a given concrete processing operation. The moisture level can also be used to determine a suitable time to apply chemicals and the like which require a certain moisture level to work efficiently.

The machine 700 may furthermore comprise a durometer arranged to determine a surface hardness level of the concrete surface 310. The durometer may comprise a hammer device arranged for determining concrete hardness by determining a rebound energy.

Alternatively or in combination with the durometer, the machine 700 may comprise a device arranged to form a scratch in the concrete surface. The depth of this scratch can then be detected and used to determine a surface hardness level of the concrete surface 310. The depth may be determined using a vision-based sensor such as a camera, or a laser sensor.

Figure 8:
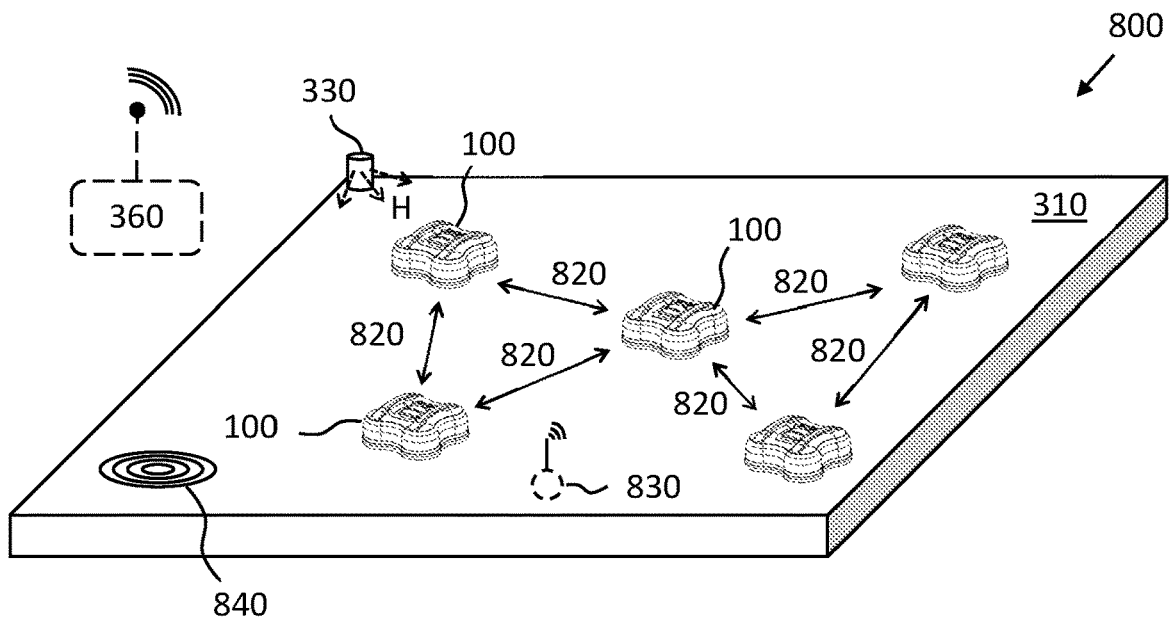
FIG. 8 shows a swarm of concrete surface processing machines.

FIG. 8 illustrates an example concrete surface processing system 800 comprising a plurality of machines 100 according to the above discussion. The plurality of machines may be of the same type, i.e., either small machines such as the machine 100, or larger machines such as the machine 600. However, additional advantages may be obtained if a combination of different machines are used to process a larger concrete surface. The smaller machines may then process areas which require a lot of maneuvering and which may be hard to access for the larger machines, while the larger machines may perform tasks where larger size is an advantage.

FIG. 8 illustrates an example concrete surface processing system 800 comprising a plurality of concrete surface processing machines according to the discussions herein, and a rotary laser device 330 arranged to generate a laser beam H parallel to the concrete surface.

The system optionally comprises a remote device 360 arranged communicatively coupled to at least one of the concrete surface processing machines.

One or more of the machines may be configured with transportation mode tool heads allowing the machine to traverse segments of the concrete surface which have not yet matured enough for processing. These machines may then act as scouts, surveying the concrete surface, and reporting back to the other machines when a sufficient level of maturity has been reached on a given concrete segment for a given concrete processing operation.

The machines comprise a control unit 110 with a radio transceiver arranged to establish a communication link 820 to at least one other machine, or to a remote control device. This way the plurality of machines can form a mesh network in order to exchange information and perform arbitration in case of any control conflicts which arise.

The plurality of machines may also be communicatively coupled, e.g., by wireless radio link, to a central control unit 360 arranged to control a floor grinding operation over a concrete surface 310. This central control unit 360 may control the "swarm" of machines to complete a larger floor grinding task.

The machines may furthermore comprise a positioning system arranged to position the respective machines in a coordinate system relative to the concrete surface 310. This positioning data can be used by the external control unit 360 in order to control the floor processing operation. The machines may also be arranged for autonomous operation, i.e., for processing the concrete surface in a collaborative manner without guidance from a central control unit 360.

An inductive charging station 840 may be embedded into the concrete surface. The machines 100 may then regularly return to the charging station to replenish the energy storage, i.e., charge the on-board batteries.

One or more concrete maturity sensors 830 may also be embedded into the concrete surface. This sensor measures, e.g., temperature and moisture in the concrete slab and is thus able to determine a current concrete maturity level of the concrete surface 310. Based on a time sequence of data samples, the maturity sensor, or the control unit 110, may extrapolate to estimate a future concrete maturity level over the concrete surface. This allows the swarm of machines to work where it is as most efficient given the maturity levels over the concrete surface.

Figure 9:
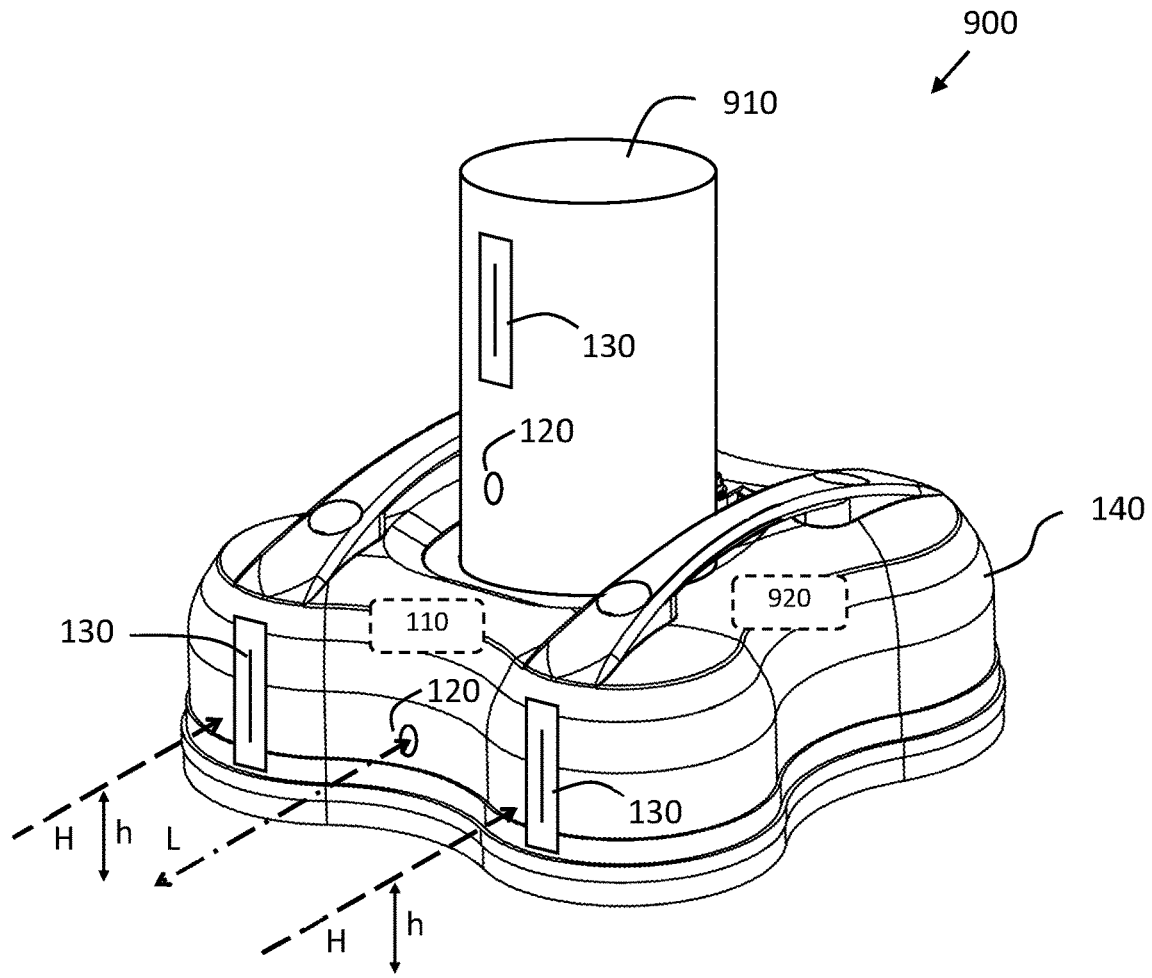
FIG. 9 illustrates a machine with dust collecting capability.

FIG. 9 illustrates some other aspects of the disclosed machines for concrete surface processing. This machine 900 comprises a dust container 910 arranged to hold a quantity of dust. The machine also comprises a suction device 920 which is only schematically illustrated in FIG. 9. The suction device 920 and the dust container 910 allow the machine 900 to collect dust from the concrete surface 310, such as dust generated during grinding.

The machine 900 may comprise tools for grinding, i.e., rotatable discs for abrasive operation. The machine 900 then performs both grinding as well as collecting the dust generated by the grinding.

The machine 900 may also be configured as a dedicated dust collector machine. In this case there are no grinding tools attached. Instead, the machine may comprise brushes configured on the tool holders 150. One possible realization of this type of dust collecting machine is obtained if the troweling blades in FIG. 1D is replaced by brushes. The dust container 910 may be used as supporting structure for one or more of the sensors on the machine, as schematically illustrated in FIG. 9.

Figure 10:
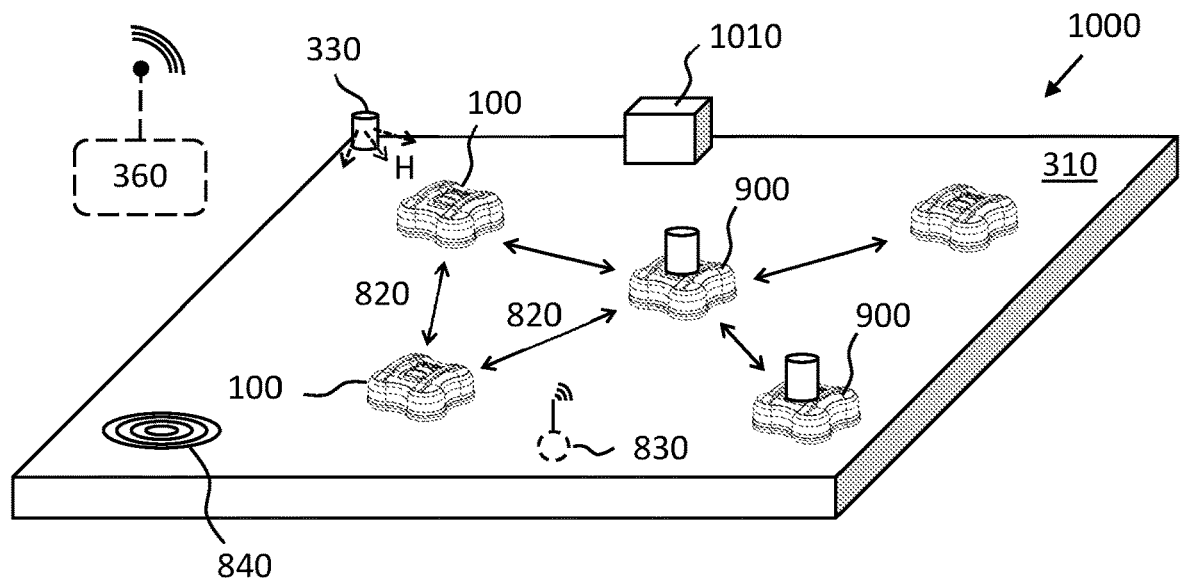
FIG. 10 shows a swarm of concrete surface processing machines.

FIG. 10 illustrates a concrete surface processing system 1000. The system comprises a plurality of machines 100, 900 which are processing the concrete surface in a collaborative manner. The system is similar to the concrete surface processing system discussed in connection to FIG. 8, but this system also comprises one or more machines 900 with the suction device 920 arranged to collect dust from the concrete surface 310, and the dust container 910 for holding an amount of collected dust. The system also comprises a central dust collection station 1010 which is arranged to empty the dust containers of the machines with dust collecting ability. The machines then navigate to the central dust collection station 1010 whereupon the dust container is emptied via a hose or other form of connector. The dust containers 910 may of course also be manually emptied by an operator. In this case, the control unit 110 may transmit a signal to, e.g., a remote wireless device 1310, 1320 indicating a need for emptying the dust container 910.

Figure 11:
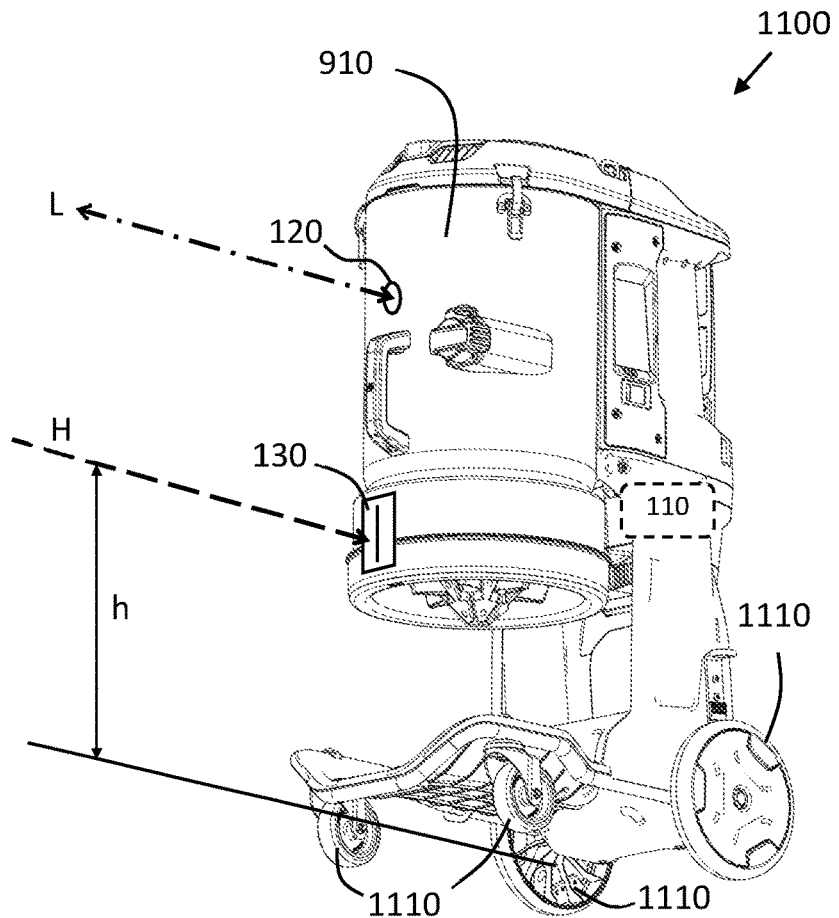
FIG. 11 illustrates a dust collecting machine.

The teachings herein may also be applied to more conventional types of dust containers, such as the dust collector 1100 illustrated in FIG. 11. This machine 1100 has been equipped with the same type of control unit 110 as discussed above and may comprise any of the linear photo array sensor 130 and/or the range finder 120, enabling it to determine a topology map, and also to perform SLAM based on the range data from the range finder sensor 120. The control unit 110 may control motion of the dust collector 1100 by driven wheels 1110, powered by electrical machines. Thus, a conventional dust collector such as the dust collector 1100 may be equipped with sensor systems 120, 130 and a control unit 110, to perform topology map generation, as well as surface mapping and potentially also surface quality analysis. FIG. 12 shows a version of the machine discussed above in connection to FIG. 7, but now based on a machine supported on wheels, such as the dust collector 1100 in FIG. 11. The machine 1200 has the same capabilities as the machine in FIG. 7 when it comes to surveying the concrete surface 310.

The machine 1200 may also comprise means for weighting the amount of collected dust and slurry from the concrete surface. This amount of dust ad slurry can be used to estimate a cutting rate/performance of used abrasive tools.

FIGS. 13A and 13B illustrate example remote controls 1310, 1320 which can be used to control the different machines 100, 600, 700, 900, 1100 discussed herein. The remote control device 1310 is a conventional remote control device which connects to the control unit 110 of the machine via wireless radio link. The remote control device 1320 in FIG. 13B is a tablet or smartphone which connects to the control unit 110 to issue control commands and/or to receive status reports and other information back from the control unit 110.

FIG. 14 illustrates a process 1400 for processing a concrete surface 310. This process may be performed by different types of machines or by the same machine. The process comprises surveying 1410 the concrete surface in preparation for processing the concrete surface. This step may comprise, e.g., evaluating a quality of the concrete surface, determining, and suggesting suitable tools for performing concrete processing, and perhaps indicating suitable time windows for each processing step. The process then comprises a step 1420 where the surface processing system is configured. This step may comprise, e.g., inputting directives to a swarm of concrete surface processing machines or programming a single concrete surface processing machine. The process then continues with a step 1430 where the concrete surface is processed. This step may comprise troweling the surface, grinding the surface, and/or polishing the surface. A final step 1440 comprises verifying that an intended result has been achieved. This step may comprise evaluating surface quality by, e.g., the machine 700 discussed in connection to FIG. 7.

Figure 15A:
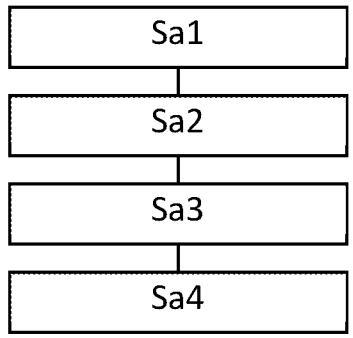
FIGS. 15A-C are flow charts illustrating methods.

FIG. 15A is a flow chart illustrating a method for processing a concrete surface 310. The method comprises deploying Sa1 a rotary laser device 330 on or in connection to the concrete surface 310. The rotary laser device 330 may either be placed directly onto the floor or mounted onto a wall or the like in connection to the concrete surface of interest. The rotary laser device is arranged to generate a laser beam H. The method also comprises configuring Sa2 a concrete surface processing machine 100, 600, 900, 1100 supported on the concrete surface by one or more support elements 150, 1110 extending in a base plane 101 of the machine parallel to the concrete surface 310, connecting Sa3 a control unit 110 of the machine to at least one linear photo sensor 130 on the machine extending transversally to the base plane 101, and detecting Sa4 a height h of the laser beam H relative to the base plane 101, by the linear photo sensor 130, based on a point of incidence of the incoming laser beam H on the linear photo sensor 130.

Figure 15B:
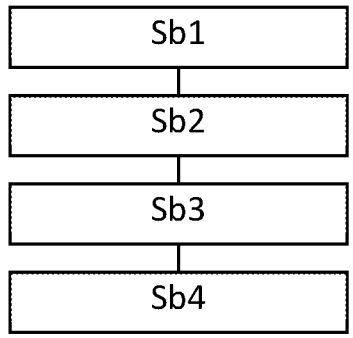

FIG. 15B is a flow chart illustrating a method for processing a concrete surface 310. The method comprises configuring Sb1 a concrete surface processing machine 100, 600, 900, 1100 supported on the concrete surface by one or more support elements 150, 1110 extending in a base plane 101 of the machine parallel to the concrete surface 310, controlling Sb2 the concrete surface processing machine to rotate R about an axis C normal to the base plane 101 by the one or more support elements 150, 1110, connecting Sb3 a control unit 110 on the machine to at least one laser range finder 120 arranged pointing in a fixed direction from the concrete surface processing machine, and determining Sb4 a boundary geometry 320 of the concrete surface 310 based on a sequence of ranges obtained by the laser range finder 120.

Figure 15C:
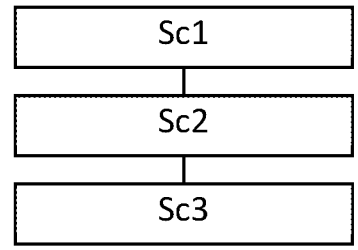

FIG. 15C is a flow chart illustrating a method for processing a concrete surface 310. The method comprises configuring Sc1 a concrete surface processing machine 100, 600, 900, 1100 for processing the concrete surface 310, wherein the machine comprises means for self-locomotion and a control unit 110 arranged to control the means for self-locomotion, connecting Sc2 one or more surface quality sensors 710, 720 to the control unit 110, wherein the surface quality sensors are arranged to determine a local surface quality of the concrete surface 310, and controlling Sc3 self-locomotion of the machine by the control unit 110 to determine a plurality of local surface quality values associated with respective different locations on the concrete surface 310.

Figure 16:
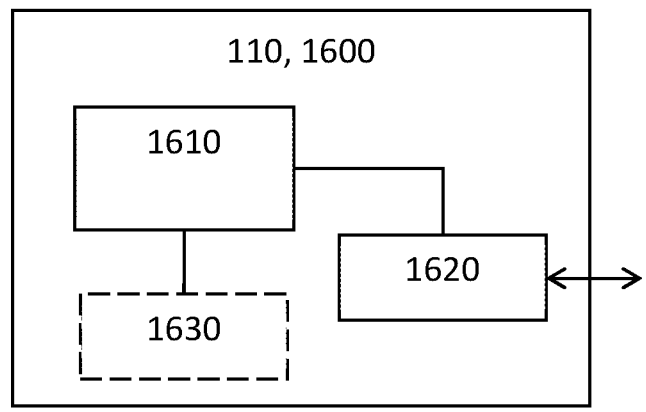
FIG. 16 schematically illustrates a control unit.

FIG. 16 schematically illustrates, in terms of a number of functional units, the general components of a control unit 110, 1600. Processing circuitry 1610 is provided using any combination of one or more of a suitable central processing unit CPU, multiprocessor, microcontroller, digital signal processor DSP, etc., capable of executing software instructions stored in a computer program product, e.g. in the form of a storage medium 1630. The processing circuitry 1610 may further be provided as at least one application specific integrated circuit ASIC, or field programmable gate array FPGA.

Particularly, the processing circuitry 1610 is configured to cause the device 180 to perform a set of operations, or steps, such as the methods discussed in connection to FIGS. 15A-C and the discussions above. For example, the storage medium 1630 may store the set of operations, and the processing circuitry 1610 may be configured to retrieve the set of operations from the storage medium 1630 to cause the device to perform the set of operations. The set of operations may be provided as a set of executable instructions. Thus, the processing circuitry 1610 is thereby arranged to execute methods as herein disclosed.

The storage medium 1630 may also comprise persistent storage, which, for example, can be any single one or combination of magnetic memory, optical memory, solid state memory or even remotely mounted memory.

The device 1600 may further comprise an interface 1620 for communications with at least one external device. As such the interface 1620 may comprise one or more transmitters and receivers, comprising analogue and digital components and a suitable number of ports for wireline or wireless communication.

The processing circuitry 1610 controls the general operation of the control unit 1600, e.g., by sending data and control signals to the interface 1620 and the storage medium 1630, by receiving data and reports from the interface 1620, and by retrieving data and instructions from the storage medium 1630.

The control unit 110, 1600 may be configured to perform all of the functions discussed above, e.g., in relation to controlling tilt angles and the like to move the machines in relation to a concrete surface.

Figure 17:
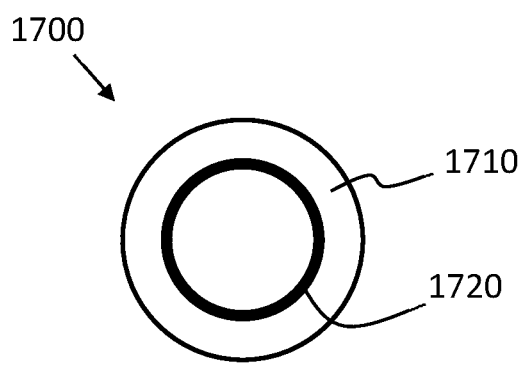
FIG. 17 shows a computer program product.

FIG. 17 illustrates a computer readable medium 1710 carrying a computer program comprising program code means 1720 for performing the methods illustrated in FIGS. 15A-C, when said program product is run on a computer. The computer readable medium and the code means may together form a computer program product 1700.

The invention claimed is:

1. A concrete surface processing machine for processing a concrete surface, the concrete surface processing machine comprising:
   one or more support elements, the one or more support elements extending parallel to the concrete surface in a base plane of the machine;
   at least one laser range finder operably coupled to the concrete surface processing machine, the at least one laser range finder being in a fixed orientation relative to the concrete surface processing machine; and
   a control unit operably coupled to the at least one laser range finder,
   wherein the concrete surface processing machine rotates via the one or more support elements about an axis extending through a centroid of the concrete surface processing machine and normal to the base plane,
   wherein as the concrete surface processing machine rotates about the axis, the at least one laser range finder is rotated about the axis by the concrete surface processing machine,
   wherein as the concrete surface processing machine rotates about the axis, the at least one laser range finder obtains a sequence of ranges to different portions of a boundary of the concrete surface, and
   wherein the control unit determines a boundary geometry of the concrete surface based on the sequence of ranges.

2. The concrete surface processing machine according to claim 1, further comprising any of an electronic compass, a gyroscope and/or an inertial measurement unit, IMU, arranged to determine an angle of rotation of the concrete surface processing machine,
   wherein the control unit is arranged to associate each determined range by the laser range finder to a respective angle of rotation of the concrete surface processing machine.

3. The concrete surface processing machine according to claim 1, wherein the control unit is arranged to obtain a position of the machine on the surface, and to associate each determined range to a respective position of the machine on the surface.

4. The concrete surface processing machine according to claim 1, wherein the control unit is arranged to determine a rotation velocity of the machine based on a frequency analysis of the determined ranges from the range finder.

5. The concrete surface processing machine according to claim 1, wherein the at least one laser range finder comprises a plurality of laser range finders arranged pointing in different respective directions from the concrete surface processing machine.

6. The concrete surface processing machine according to claim 5, wherein a first laser range finder in the plurality of laser range finders is configured for detecting range at a higher resolution compared to a second laser range finder in the plurality of laser range finders.

7. The concrete surface processing machine according to claim 5, wherein a first laser range finder in the plurality of laser range finders is configured for detecting range at a shorter distance compared to a second laser range finder in the plurality of laser range finders.

8. The concrete surface processing machine according to claim 5, wherein a first laser range finder in the plurality of laser range finders is configured in a different directional attitude compared to a second laser range finder in the plurality of laser range finders.

9. The concrete surface processing machine according to claim 1, wherein the at least one laser range finder is arranged to scan in an elevation direction.

10. The concrete surface processing machine according to claim 1, wherein the control unit is arranged to share the sequence of ranges determined by the at least one range finder with a remote device and/or with other concrete surface processing machines located on the concrete surface.

11. The concrete surface processing machine according to claim 1, comprising one or more vision-based sensors, wherein the control unit is arranged to communicate data from the vision-based sensors to a remote device.

12. The concrete surface processing machine according to claim 1, comprising a suction device arranged to collect dust from the concrete surface, and a dust container for holding an amount of collected dust.

13. The concrete surface processing machine according to claim 1, where the at least one laser range finder is associated with an angular spread below one tenth of a degree.

14. A concrete surface processing system comprising a plurality of concrete surface processing machines according to claim 1.

15. The concrete surface processing system according to claim 14, further comprising a remote device arranged communicatively coupled to at least one of the concrete surface processing machines.

16. The concrete surface processing system according to claim 14, wherein the concrete surface processing machines are arranged to exchange the respective sequences of ranges with each other over wireless links.

17. A method for processing a concrete surface using a concrete surface processing machine having one or more support elements extending parallel to the concrete surface in a base plane of the machine, at least one laser range finder operably coupled to the concrete surface processing machine, and a control unit operably coupled to the at least one laser range finder, the method comprising:

rotating the concrete surface processing machine via the one or more support elements about an axis extending through a centroid of the concrete surface processing machine and normal to the base plane;

obtaining a sequence of ranges to different portions of a boundary of the concrete surface via the at least one laser range finder as the concrete surface processing machine rotates about the axis; and determining a boundary geometry of the concrete surface based on the sequence of ranges obtained by the laser range finder via the control unit, wherein the at least one laser range finder is disposed in a fixed orientation relative to the concrete surface processing machine, and wherein as the concrete surface processing machine rotates about the axis, the at least one laser range finder is rotated about the axis by the concrete surface processing machine.

\* \* \* \* \*